(12) United States Patent
Takahashi

(10) Patent No.: US 8,401,397 B2
(45) Date of Patent: Mar. 19, 2013

(54) OPTICAL RECEPTION DEVICE, OPTICAL RECEIVING METHOD, AND OPTICAL TRANSMISSION APPARATUS

(75) Inventor: Tsukasa Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 12/623,898

(22) Filed: Nov. 23, 2009

(65) Prior Publication Data

US 2010/0135672 A1      Jun. 3, 2010

(30) Foreign Application Priority Data

Nov. 28, 2008   (JP) .................................. 2008-305654

(51) Int. Cl.
*H04B 10/12* (2006.01)

(52) U.S. Cl. ............................. 398/149; 398/25; 398/26

(58) Field of Classification Search ............... 398/25–26
See application file for complete search history.

(56) References Cited

U.S. PATENT DOCUMENTS

| 2006/0024063 | A1* | 2/2006 | Onaka et al. ................... 398/149 |
| 2008/0044180 | A1* | 2/2008 | Leonov et al. ................... 398/25 |
| 2008/0089700 | A1 | 4/2008 | Takahashi |

FOREIGN PATENT DOCUMENTS

| JP | 11-186962 | 7/1999 |
| JP | 2001-358658 | 12/2001 |
| JP | 2006-74629 | 3/2006 |
| JP | 2008-98975 | 4/2008 |

OTHER PUBLICATIONS

Japanese Office Action issued Oct. 23, 2012 in corresponding Japanese Patent Application No. 2008-305654.

* cited by examiner

*Primary Examiner* — Danny Leung
(74) *Attorney, Agent, or Firm* — Staas & Halsey LLP

(57) ABSTRACT

An optical reception device is provided. The optical reception device includes a filtering unit that receives input light of predetermined power, filters the input light by use of filter characteristics where the degree of attenuation of the power of an optical signal of predetermined frequency is lower than the degree of attenuation of the power of an optical signal of another frequency, and supplies an output light; and a determining unit that compares a value relevant to the power of the output light supplied by the filtering unit, with a threshold, and determines whether the input light contains signal light.

12 Claims, 35 Drawing Sheets

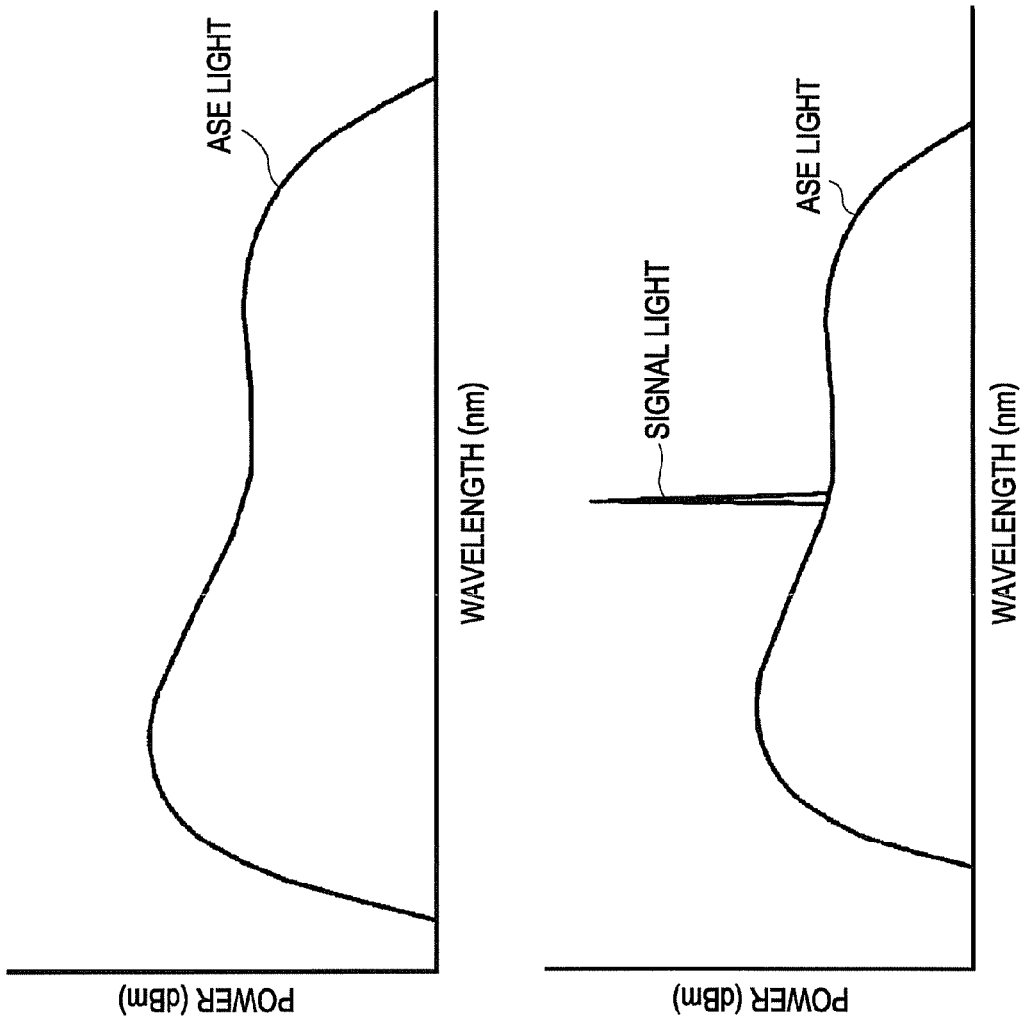

FIG. 16

| | POWER OF OPTICAL SIGNAL CONTAINING SIGNAL LIGHT | < or = or > | POWER OF OPTICAL SIGNAL CONTAINING ONLY ASE LIGHT |
|---|---|---|---|
| PreAmp "1" INPUT | POWER OF OPTICAL SIGNAL CONTAINING SIGNAL LIGHT | < or = or > | POWER OF OPTICAL SIGNAL CONTAINING ONLY ASE LIGHT |
| PreAmp "1" OUTPUT | POWER OF OPTICAL SIGNAL CONTAINING SIGNAL LIGHT | = | POWER OF OPTICAL SIGNAL CONTAINING ONLY ASE LIGHT |
| PreAmp "2" INPUT | POWER OF OPTICAL SIGNAL CONTAINING SIGNAL LIGHT | > | POWER OF OPTICAL SIGNAL CONTAINING ONLY ASE LIGHT |

FIG. 17

|  | LEVEL COMPARISON | Comp (COMPARATOR) OUTPUT |
|---|---|---|
| INPUT OF ASE LIGHT | Vmon < Vref | 0 |
| INPUT OF SIGNAL LIGHT | Vmon > Vref | 1 |

FIG. 18

| TARGET MODULE | SPECIFICATION | VALUE | UNIT | REMARKS |
|---|---|---|---|---|
| PreAmp "1" | OSNR | 20 | dB | PreAmp 1 INPUT |
| | GAIN (G) | 17.5 | dB | |
| DMUX | BAND | 0.7 | nm | WDM SIDE DEMULTIPLEXER |
| | CROSS TALK | 25 | dB | LIGHT LEAK FROM OTHER CHANNELS IS PREVENTED |
| VIPA | BAND | 0.352 | nm | 3dB BAND (44GHz) |
| | FILTER INTERVAL | 0.8 | nm | Δ |

FIG. 19

|  | SIGNAL LIGHT IS PRESENT OSNR=20dB | ONLY ASE LIGHT | UNIT |
|---|---|---|---|
| ASE COMPONENT | 1.4 | 6.4 | dBm |
| SIGNAL COMPONENT | 4.7 | - | dBm |
| TOTAL | 6.4 | 6.4 | dBm |

FIG. 20

| | SIGNAL LIGHT IS PRESENT OSNR=20dB | ONLY ASE LIGHT | UNIT |
|---|---|---|---|
| ASE COMPONENT | −2.16 | 2.83 | dBm |
| | 0.608 | 1.919 | mW |
| SIGNAL COMPONENT | 4.7 | − | dBm |
| | 2.951 | − | mW |
| TOTAL | 5.51 | 2.83 | dBm |
| | 3.56 | 1.92 | mW |

FIG. 28

|  | TDC CENTER WAVELENGTH ||
|  | NOT CHANGED | CHANGED |
| ONLY ASE LIGHT | SAME LEVEL ||
| SIGNAL LIGHT IS PRESENT | GREAT TO SMALL (MARKEDLY CHANGED) ||

OPTICAL RECEPTION DEVICE, OPTICAL RECEIVING METHOD, AND OPTICAL TRANSMISSION APPARATUS

CROSS-REFERENCE TO RELATED APPLICATION(S)

This application is based upon and claims the benefit of priority of the prior Japanese Patent Application No. 2008-305654, filed on Nov. 28, 2008, the entire contents of which are incorporated herein by reference.

FIELD

The embodiments discussed herein are directed to an optical reception device, optical receiving method, and optical transmission apparatus.

BACKGROUND

An optical reception device receives signal light or Amplified Spontaneous Emission (ASE) light as input light supplied from a Wavelength Division Multiplexing (WDM) device. ASE light is light in which no data is identified and reproduced as a result of an identification and reproduction process performed by the optical reception device. ASE light is light noise generated when a WDM device amplifies light. Signal light is light in which data is identified and reproduced as a result of an identification and reproduction process performed by the optical reception device. When signal light is input, ASE light may be input together with the signal light Upon receiving input light, a conventional optical reception device identifies and reproduces data from the input light and, if data is identified and reproduced from the input light, determines that the input light contains signal light. In other words, the optical reception device subjects input light to the operation for the identification and reproduction of data and determines the presence or absence of signal light in the input light on the principle that data cannot be identified and reproduced if the input light consists only of ASE light. Japanese Patent Application Laid-Open No. 2008-098975 discloses a method in which signal light whose waveform has been deteriorated by wavelength dispersion is subjected to dispersion compensation.

The foregoing conventional technology suffers from the problem that a determination cannot be accurately made whether input light contains signal, light. That is, in order to determine whether input light contains signal light, in the conventional technology the optical reception device has to subject input light to a process of identification and reproduction of data.

SUMMARY

It is an aspect of the embodiments discussed herein to provide an optical reception device.

The above aspects can be attained by a system a optical reception device including a filtering unit that receives input light of predetermined power, filters the input light by use of filter characteristics where the degree of attenuation of the power of an optical signal of predetermined frequency is lower than the degree of attenuation of the power of an optical signal of another frequency, and supplies an output light; and a determining unit that compares a value relevant to the power of the output light supplied by the filtering unit, with a threshold, and determines whether the input light contains signal light.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 illustrates an optical signal (containing only ASE light) output by the PreAmp in a first exemplary embodiment.

FIG. 11 illustrates an optical signal (containing signal light) output by the PreAmp in a first exemplary embodiment.

FIG. 16 illustrates the power differences between the optical signals in a first exemplary embodiment.

FIG. 17 illustrates "1" and "0" signals output by Comp in a first exemplary embodiment.

FIG. 18 illustrates the specifications of each part, together with the power differences between the optical signals.

FIG. 19 illustrates optical signals output from the PreAmp [1], together with the power difference between the optical signals.

FIG. 20 illustrates optical signals output from the dispersion compensator, together with the power difference between the optical signals.

FIG. 28 illustrates the presence or absence of change in the center wavelength, together with the power difference in output light.

DETAILED DESCRIPTION OF EMBODIMENTS

An optical reception device, optical receiving method, and optical transmission apparatus according to the exemplary embodiments will hereinafter be described in detail with reference to the accompanying drawings. A description will be given using as an example an optical transmission/reception device having both an optical reception device that receives an optical signal and an optical transmitting device that transmits the received optical signal.

A disclosure includes an optical transmission/reception device according to a first exemplary embodiment. A relation between the optical transmission/reception device according to a first exemplary embodiment and the WDM device. The configuration of the optical transmission/reception device according to a first exemplary embodiment and the flow of its processing. The effects of the optical transmission/reception device according to a first exemplary embodiment. The other embodiments. The term "optical transmission apparatus" may be defined to an apparatus that includes an optical transmission/reception device and the WDM device.

Figure 1:
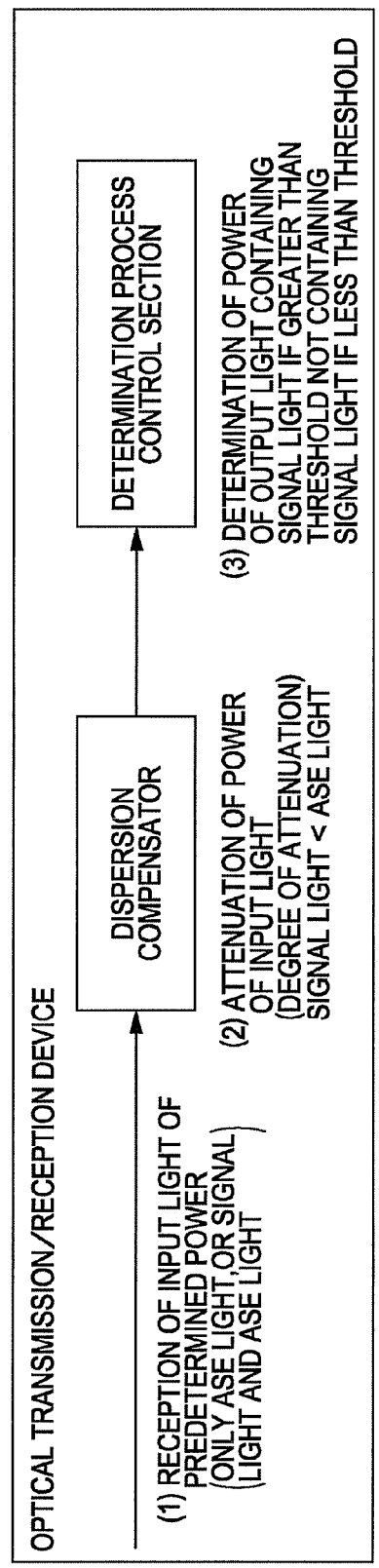
FIG. 1 illustrates an optical transmission/reception device according to a first exemplary embodiment.

Referring to FIG. 1, the optical transmission/reception device (hereinafter also called "transponder") according to a first exemplary embodiment is described. FIG. 1 illustrates the outline of the optical transmission/reception device according to a first exemplary embodiment.

As illustrated in (1) in FIG. 1, the optical transmission/reception device according to a first exemplary embodiment is configured such that a dispersion compensator receives input light of predetermined power. Specifically, using an optical amplifier (not shown) in the optical transmission/reception device, the dispersion compensator further amplifies ASE light or light containing signal light and ASE light to predetermined power, and receives this light as an input light.

As illustrated in (2) in FIG. 1, the dispersion compensator filters the input light received using a filter characteristic where the degree of attenuation of the power of an input light containing signal light is lower than the degree of attenuation of the power of an input light containing no signal light. The dispersion compensator outputs this filtered light.

In other words, the dispersion compensator has a filter characteristic where the degree of attenuation of the power of ASE light contained in the input light is higher than that of the power of signal light contained in the input light. As a result, the dispersion compensator outputs light of higher power when having received input light containing signal light and ASE light, compared to when having received input light containing only ASE light.

In the optical transmission/reception device according to a first exemplary embodiment, as shown in (3) in FIG. 1, a determination process control section compares the power of the light output from the dispersion compensator with a threshold value. If according to the comparison the power of the output light is greater than the threshold, the determination is made that the input light contains signal light. If the power of the output light is less than the threshold value, the determination is made that the input light contains no signal light.

In this way, the optical transmission/reception device according to a first exemplary embodiment can correctly determine whether input light contains signal light. To be specific, whether input light contains signal light can be determined without performing a reproduction process, in which a signal is reproduced from the input light.

Figure 2:
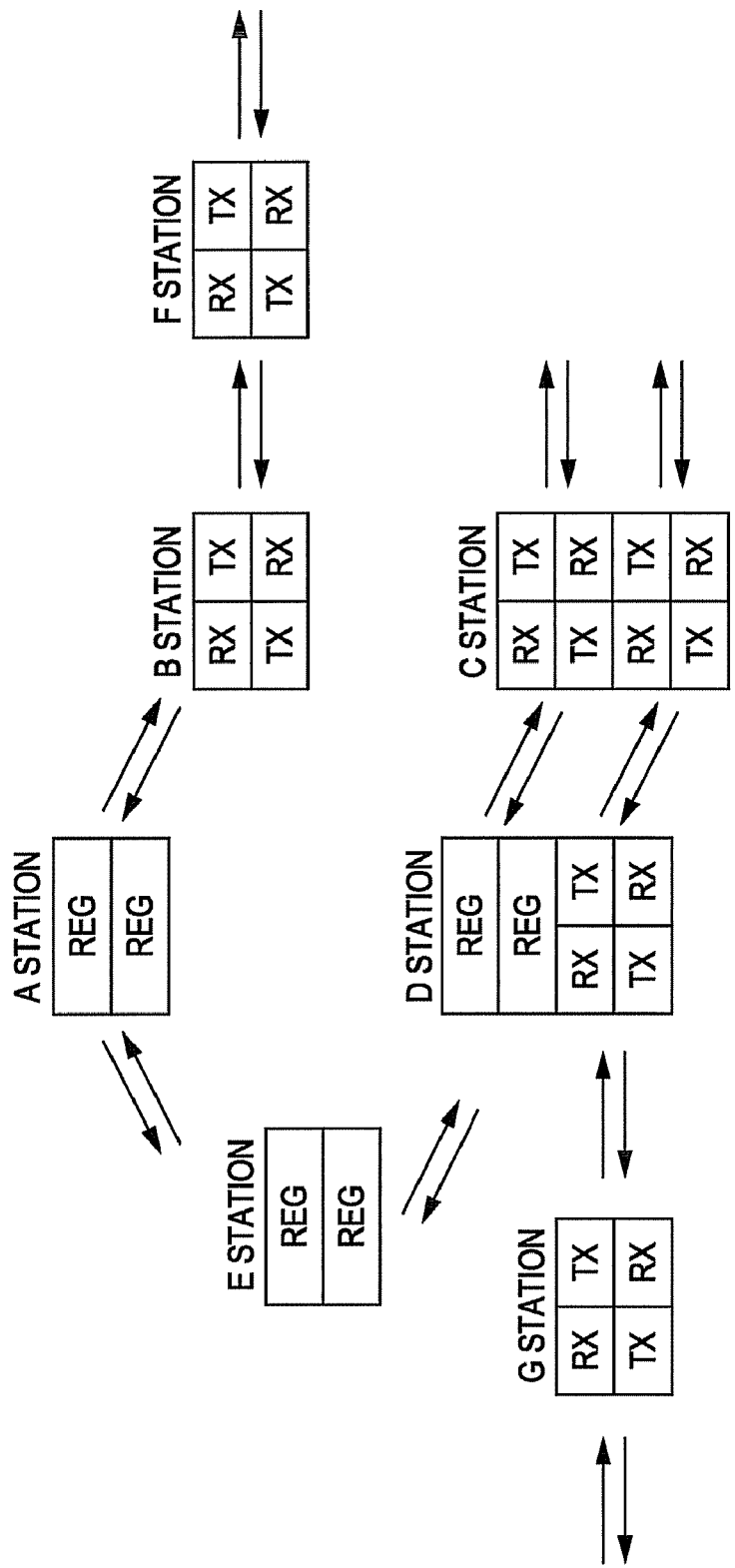
FIG. 2 illustrates an optical transmission apparatuses in a network.

Next, referring to FIGS. 2 to 5, a relation between the optical transmission/reception device 200 and the WDM device 100 will briefly be described. Each of stations A to G shown in FIG. 2 serves as an optical transmission apparatus and transmits and/or receives optical signals in a network. FIG. 2 illustrates the optical transmission apparatuses in the network.

The optical transmission apparatuses are used as reproduction relays for relaying optical signals and include interfaces between the network and client sides and serve as apparatuses for transmitting and/or receiving optical signals. Such optical transmission apparatuses for use as reproduction relays correspond to the apparatuses shown as Regenerators (REGs) (e.g., the stations A and E) in FIG. 2. On the other hand, the other optical transmission apparatuses, used as apparatuses for transmitting and/or receiving optical signals by way of interfaces between the network and client sides, correspond to apparatuses (e.g., the stations B and F) that have both Transmitter TX and Receiver RX in FIG. 2.

The arrows in FIG. 2 indicate the directions of optical signals transmitted in the network. In the example shown in FIG. 2, the stations between which signals are transmitted and/or received are predetermined but these stations may be connected to different stations depending on intended use.

Figure 3:
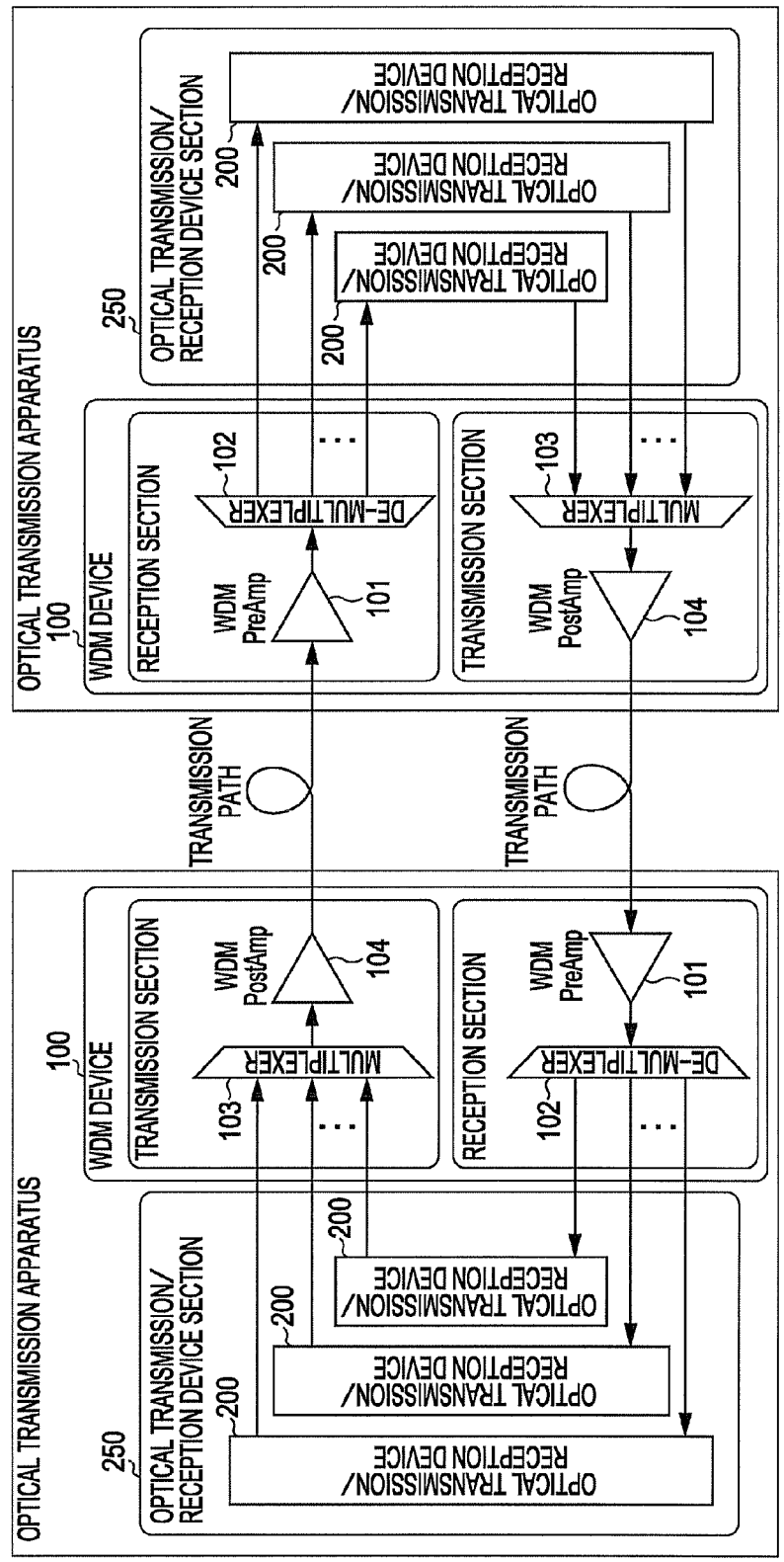
FIG. 3 illustrates an exemplary optical transmission apparatus that has both TX and RX.

Referring to FIG. 3, a description is given of an example of the configuration of each of the optical transmission apparatuses which has both the TX and RX. As shown in FIG. 3, each optical transmission apparatus includes a WDM device 100 and a plurality of optical transmission/reception devices 200, which are connected. A receiving section in the WDM device 100 receives an optical signal from a transmission path, and transmits to the optical transmission/reception devices 200 signal light whose wavelength is divided according to channels. FIG. 3 illustrates an example of the configuration of the optical transmission apparatus that has both the TX and RX.

Signal light unit light that is subjected to an identification and reproduction process by the optical transmission/reception device 200 which thereby identifies and reproduces data. A channel unit a wavelength (or frequency) containing a corresponding multiplexed signal light. Where an optical signal received by the receiving section of the WDM device 100 is multiplexed using all channels, each of these channels contains a corresponding signal light. In FIG. 3, a group of optical transmission/reception devices 200 for the corresponding channels is labeled as an optical transmission/reception device section 250.

The receiving section of each WDM device 100 includes a WDM PreAmp 101 and a De-Multiplexer 102. In the receiving section of the WDM device 100, the WDM PreAmp 101 amplifies received optical signals in batches. The receiving section amplifies the multiplexed optical signal without dividing it into wavelengths. The De-Multiplexer 102 divides the batch of amplified optical signals into channels (i.e., wavelengths), and transmits each of these channels to the corresponding optical transmission/reception device 200. Each optical transmission/reception device 200 is assigned to a corresponding channel (i.e., wavelength), and receives an optical signal in a specific wavelength area. Thereafter, each optical transmission/reception device 200 converts the received optical signal into an electrical signal, and transmits the electrical signal to other devices connected to the optical transmission apparatus. The term "other devices" may be defined as a device that transmits and/or receives information using an optical transmission apparatus. For example, it may be a device serving as a client of the optical transmission apparatus.

If a signal light contained in a received optical signal is not included in any channel, the receiving section of each WDM device 100 causes the WDM PreAmp 101 to shut down the optical signal. That is, the WDM PreAmp 101 will not transmit the optical signal to the De-Multiplexer 102. If a signal light contained in the received optical signal is included in at least one channel, the receiving section of the WDM device 100 amplifies the light. Accordingly, ASE light is transmitted to an optical transmission/reception device 200 corresponding to a channel that contains no optical signal whereas ASE light and signal light are transmitted to an optical transmission/reception device 200 corresponding to a channel containing an optical signal.

A supplementary description is given of the determination made by the WDM PreAmp101 as to whether a signal light is present. The WDM PreAmp 101 includes a Photo Diode (PD) (not shown) that monitors a received optical signal. Using the level of the optical signal detected by the PD, the WDM PreAmp 101 determines whether the received optical signal contains signal light. The WDM PreAmp101 determines that the received optical signal contains no signal light if the level detected by the PD is lower than the level detected when only one channel includes signal light. Equally, the WDM PreAmp101 determines that the received optical signal contains no signal light if monitor control signal light transmitted and received between other optical transmission apparatuses provides the information that there is no channel in operation.

In other words, ASE light is light in which no data has been identified and reproduced as a result of an identification and reproduction process performed by the optical transmission/reception device 200. ASE light is, for example, light noise that may occur when the WDM PreAmp 101 amplifies light.

The transmitting section of each WDM device 100 transmits on a corresponding transmission path the optical signals received from the optical transmission/reception devices 200. The optical transmission/reception devices 200 receive the electrical signals from other devices connected to the optical transmission apparatus, convert the received electrical signals into optical signals, and output these optical signals to the WDM device 100.

The transmitting section of the WDM device 100 includes a Multiplexer 103 and a WDM PostAMP 104. The Multiplexer 103 combines the wavelengths of optical signals received from the optical transmission/reception devices 200. The WDM PostAmp 104 amplifies the combined optical signals in batches, and transmits them on the corresponding transmission path.

Figure 4:
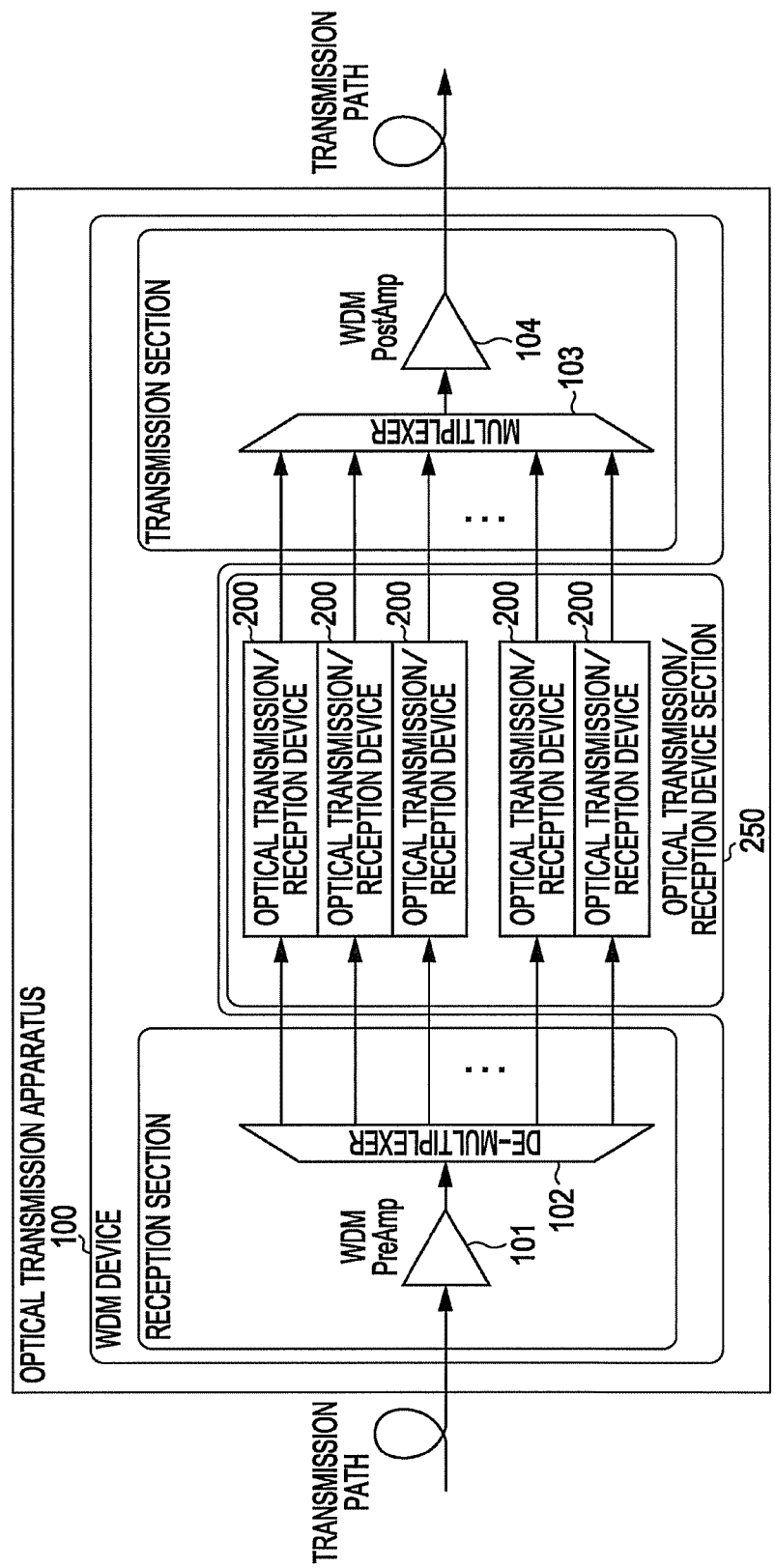
FIG. 4 illustrates an exemplary optical transmission apparatus used as a REG.

Referring to FIG. 4, next will be described the optical transmission apparatuses used as REGs shown in FIG. 2. In the description of the REGs shown in FIG. 2, the content overlapping with the description using FIG. 3 will be omitted. FIG. 4 illustrates an example of the configuration of the optical transmission apparatus used as a REG.

In the example shown in FIG. 4, the optical transmission apparatus is a relay that relays an optical signal such that the received optical signal is first reproduced as an electric waveform, then reconverted into an optical signal, and it is this optical signal that is transmitted. In this case, the optical transmission apparatus transmits an optical signal to a device different from that to which optical signals received by the receiving section of the WDM device 100 are transmitted.

Figure 5:
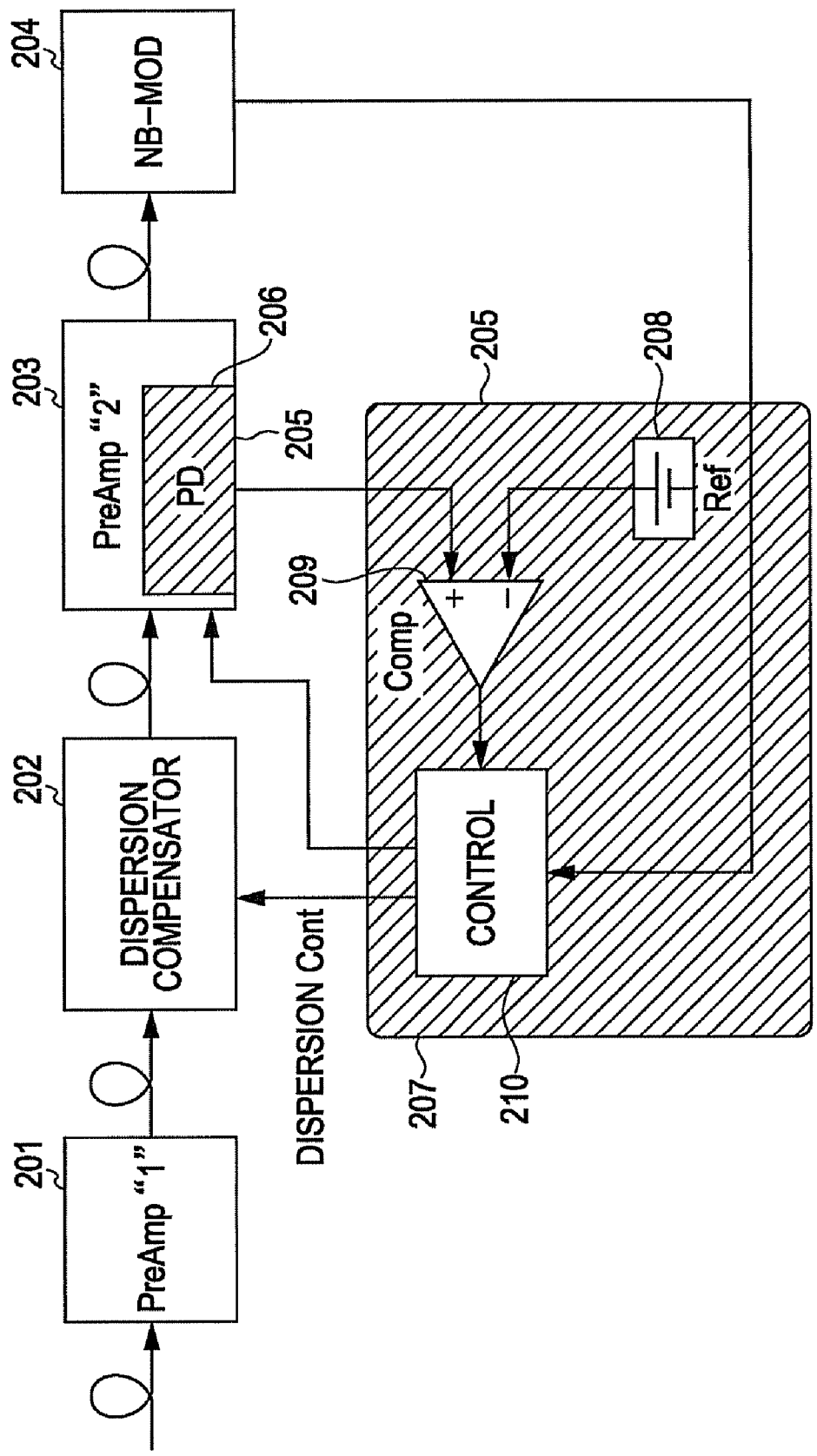
FIG. 5 illustrates an exemplary optical transmission/reception device according to a first exemplary embodiment.

FIG. 5 illustrates an example of the configuration of optical transmission/reception device according to a first exemplary embodiment. The description given below is of the optical transmission/reception device 200 that processes an optical signal for a given channel unless otherwise specified.

As shown in FIG. 5, the optical transmission/reception device 200 includes a PreAmp [1] 201, a dispersion compensator 202, a PreAmp [2] 203, a Narrow Band Module (NB-MOD) 204, and, further, a determination process control section 205. The determination process control section 205 has a PD 206 and a unit control 207. In the following description of the PreAmp [1] 201, dispersion compensator 202, PreAmp [2] 203, and NB-MOD 204, their relations with the determination process control section 205 will not be referred to in particular.

The PreAmp [1] 201 is connected to the dispersion compensator 202 and also to the De-Multiplexer 102 of the WDM device 100. The PreAmp [1] 201 receives an optical signal for a specific channel from the De-Multiplexer 102, amplifies the optical signal to a predetermined power and transmits it to the dispersion compensator 202.

A description is given of an optical signal received from the De-Multiplexer 102 by the PreAmp [1] 201. In the position indicated by (1) in FIG. 6, the wavelength of the optical signal is still undivided. The De-Multiplexer 102 receives the optical signal whose wavelength is still undivided according to channel. For example, the De-Multiplexer 102 receives an optical signal whose signal light has been multiplexed, as shown in FIG. 7. The horizontal and vertical axes in FIG. 7 indicate the frequency (i.e., wavelength) λ and power, respectively, of the light.

Figure 6:
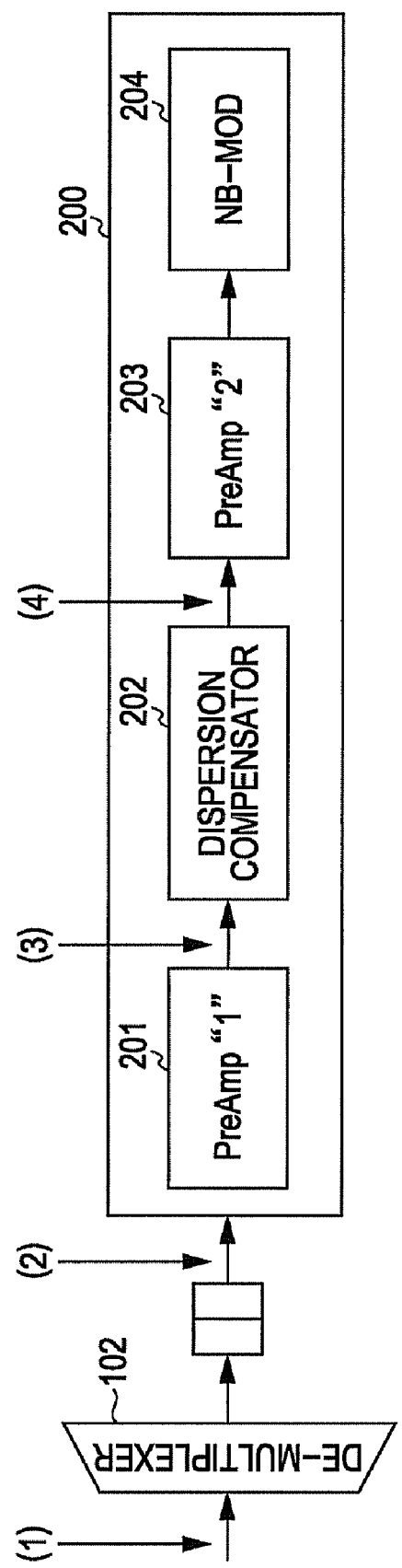
FIG. 6 illustrates a relation between the optical transmission/reception device and each part of a WDM device, and explaining the states of an optical signal in a first exemplary embodiment.
Figure 7:
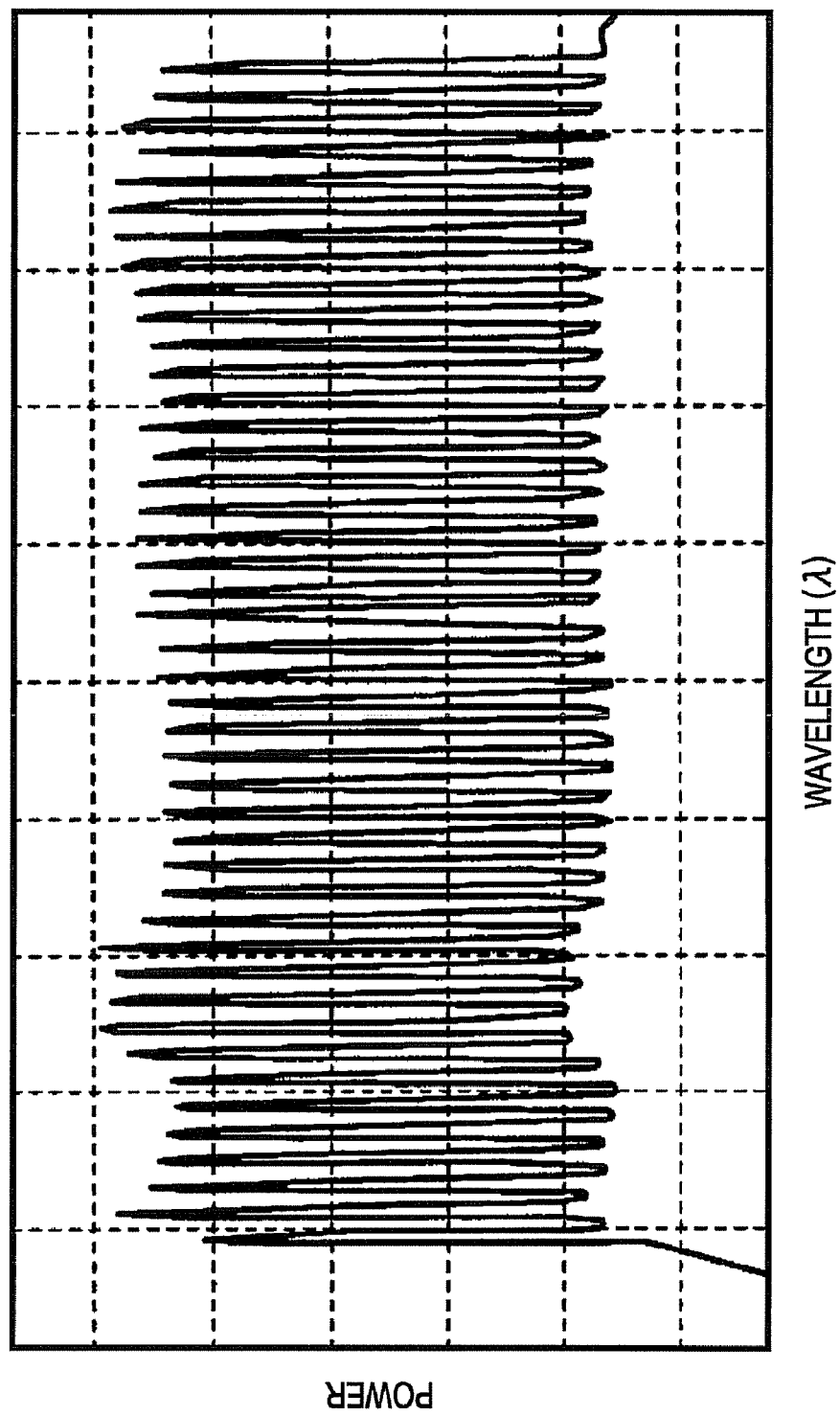
FIG. 7 illustrates an optical signal received by a De-Multiplexer in a first exemplary embodiment.

FIG. 6 illustrates a relation between the optical transmission/reception device and each part of the WDM device, and explaining the states of an optical signal in a first exemplary embodiment. FIG. 7 is a diagram illustrating an optical signal received by the De-Multiplexer in a first exemplary embodiment.

Figure 8:
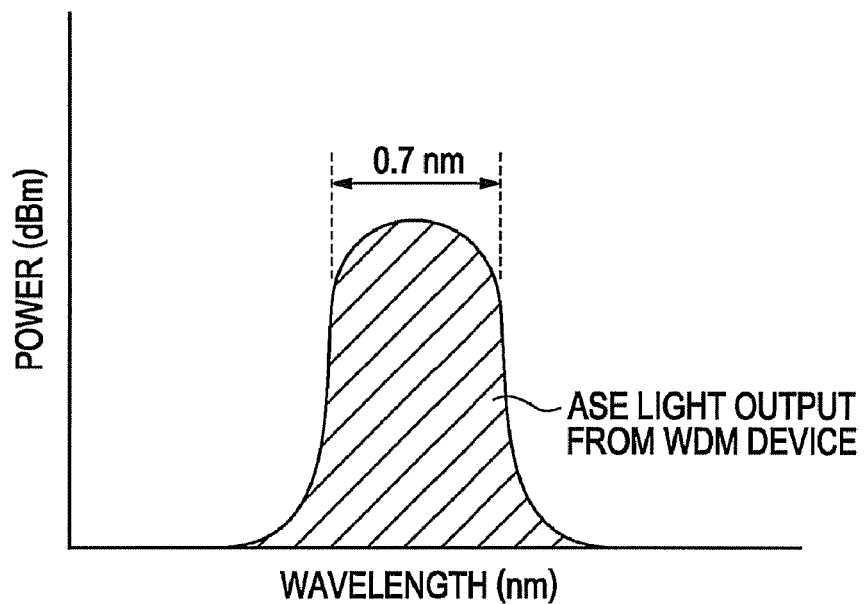
FIG. 8 illustrates an optical signal (containing only ASE light) received by a PreAmp in a first exemplary embodiment.
Figure 9:
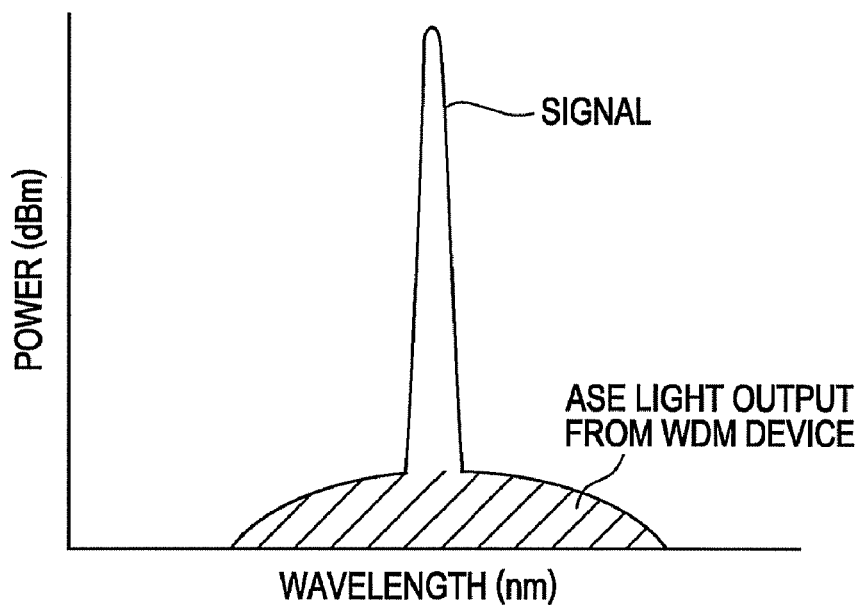
FIG. 9 illustrates an optical signal (containing signal light) received by the PreAmp in a first exemplary embodiment.

In the position indicated by (2) in FIG. 6, the optical signal is divided into optical signal components, each of which has one of the predetermined wavelength components into which the wavelength of the optical signal has been divided by the De-Multiplexer 102. As shown in FIGS. 8 and 9, the PreAmp

[1] 201 receives an optical signal component with one of the wavelength components into which the wavelength of the optical signal has been divided according to channels by the De-Multiplexer 102. In the FIGS. 8 and 9, the horizontal and vertical axes indicate wavelength and power respectively.

In FIG. 8, "0.7 nm" indicates an example of the transmission band of a multiplexer/demultiplexer of 1000 grid. For example, it indicates that an optical signal of 0.7 nm band passes through each channel (i.e., wavelength).

As optical signal components resulting from division of the wavelength according to channels, the PreAmp [1] 201 receives an optical signal component containing only ASE light, as shown in FIG. 8, and optical signal components containing signal light and ASE light, as shown in FIG. 9. In a first exemplary embodiment, although it has not been referred to in particular, the PreAmp [1] 201 may receive an optical signal containing only signal light.

FIG. 8 illustrates an optical signal (containing only ASE light) received by the PreAmp in a first exemplary embodiment. FIG. 9 illustrates an optical signal (containing signal light) received by the PreAmp in a first exemplary embodiment. Each of the optical transmission/reception devices 200 is assigned to a corresponding channel (i.e., wavelength) and the PreAmp [1] 201 receives optical signals in specific wavelength regions.

Next will be described the PreAmp [1] 201 that amplifies a received optical signal to a predetermined power and transmits it to the dispersion compensator 202. The PreAmp [1] 201 amplifies the optical signal received from the De-Multiplexer 102 to a fixed power and transmits it to the dispersion compensator 202. That is, in the position indicated by (3) in FIG. 6, the optical signal is of fixed power.

For example, the PreAmp [1] 201 performs an amplifying operation such that an optical signal containing only ASE light of wavelength characteristic as shown in FIG. 10 and a optical signal containing both signal light and ASE light of wavelength characteristic as shown in FIG. 11 are identical in terms of power of overall light. FIG. 10 illustrates an optical signal (containing only ASE light) output by the PreAmp in a first exemplary embodiment. FIG. 11 illustrates an optical signal (containing signal light) output by the PreAmp in a first exemplary embodiment. In the FIGS. 10 and 11, the horizontal and vertical axes indicate wavelength and power respectively.

Next will be described the differences between the optical signal output by the PreAmp [1] 201 when the optical signal contains only ASE light and the optical signal output by the PreAmp [1] 201 when the optical signal contains signal light and ASE light. The PreAmp [1] 201 transmits an optical signal of predetermined power. As a result, the sum of the power of the signal light and the power of the ASE light, shown in FIG. 11, is equal to the value of the power of the ASE light shown in FIG. 10. That is, the power of the ASE light shown in FIG. 10 is greater than that of the ASE light shown in FIG. 11. The power of the ASE light shown in FIG. 10 is greater than that shown in FIG. 11 by an amount corresponding to the power of the signal light shown in FIG. 11.

The PreAmp [1] 201 may be, for example, an Erbium Doped Fiber Amplifier (EDFA).

The dispersion compensator (e.g., Tunable Dispersion Compensator (TDC)) 202 is connected to the PreAmp [1] 201 and PreAmp [2] 203. The dispersion compensator 202 may be of, for example, Virtually Imaged Phased Array (VIPA) type. Alternatively, it may be of Arrayed Waveguide Grating (AWG) type, Etalon type, Fiber Bragg Grating (FBG) type, or Mach Zehnder Interferometer (MZI) type.

The dispersion value of the dispersion compensator 202 may be controlled by the determination process control section 205 (described below).

Figure 12:
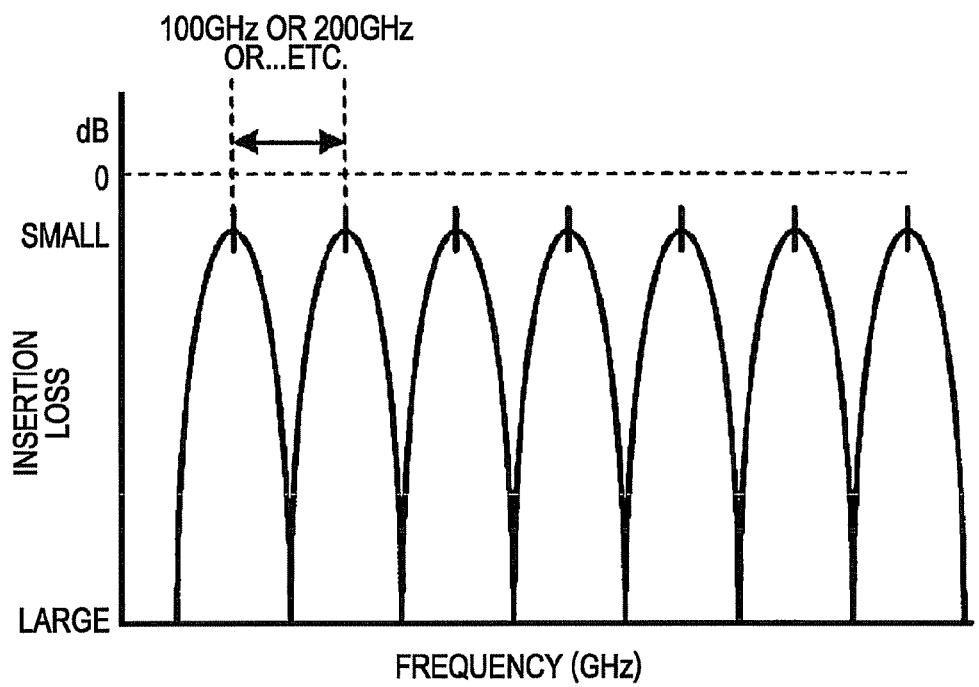
FIG. 12 illustrates the filter characteristics of the dispersion compensator in a first exemplary embodiment.

The dispersion compensator 202 has filter characteristics, as shown in FIG. 12, where the degree of attenuation of the power of optical signal containing signal light is lower than the degree of attenuation of the power of optical signal not containing signal light. In other words, the dispersion compensator 202 has filter characteristics where the degree of attenuation of the power of ASE light contained in an optical signal is higher than the degree of attenuation of the power of signal light contained in an optical signal. FIG. 12 illustrates the filter characteristics of the dispersion compensator in a first exemplary embodiment. An optical signal received by the dispersion compensator 202 is called "input light" whereas that output from the dispersion compensator 202 is called "output light." If the insertion loss is below 0 dB in FIG. 12, it indicates that the insertion loss is negative and hence power loss is great.

In the example of the filter characteristics shown in FIG. 12, the horizontal and vertical axes indicate frequency (i.e., wavelength) and insertion loss respectively. The term "insertion loss" unit the amount of attenuation of an optical signal received by the dispersion compensator 202. As shown in FIG. 12, according to the filter characteristics of the dispersion compensator 202, the insertion loss is smaller within the range of a predetermined frequency but is larger outside this range. The predetermined frequency corresponds to the frequency of the signal light. In the example in FIG. 12, the predetermined frequency is assumed to be 100-200 GHz. The explanation assumes that the filter characteristics in FIG. 12 correspond to a number of predetermined frequencies.

The dispersion compensator 202 receives an optical signal of predetermined power transmitted by the PreAmp [1] 201. That is, in the position indicated by (3) in FIG. 6, the dispersion compensator 202 receives an optical signal that has been amplified to a predetermined power by the PreAmp [1] 201, as shown in FIG. 10 or 11.

Figure 13:
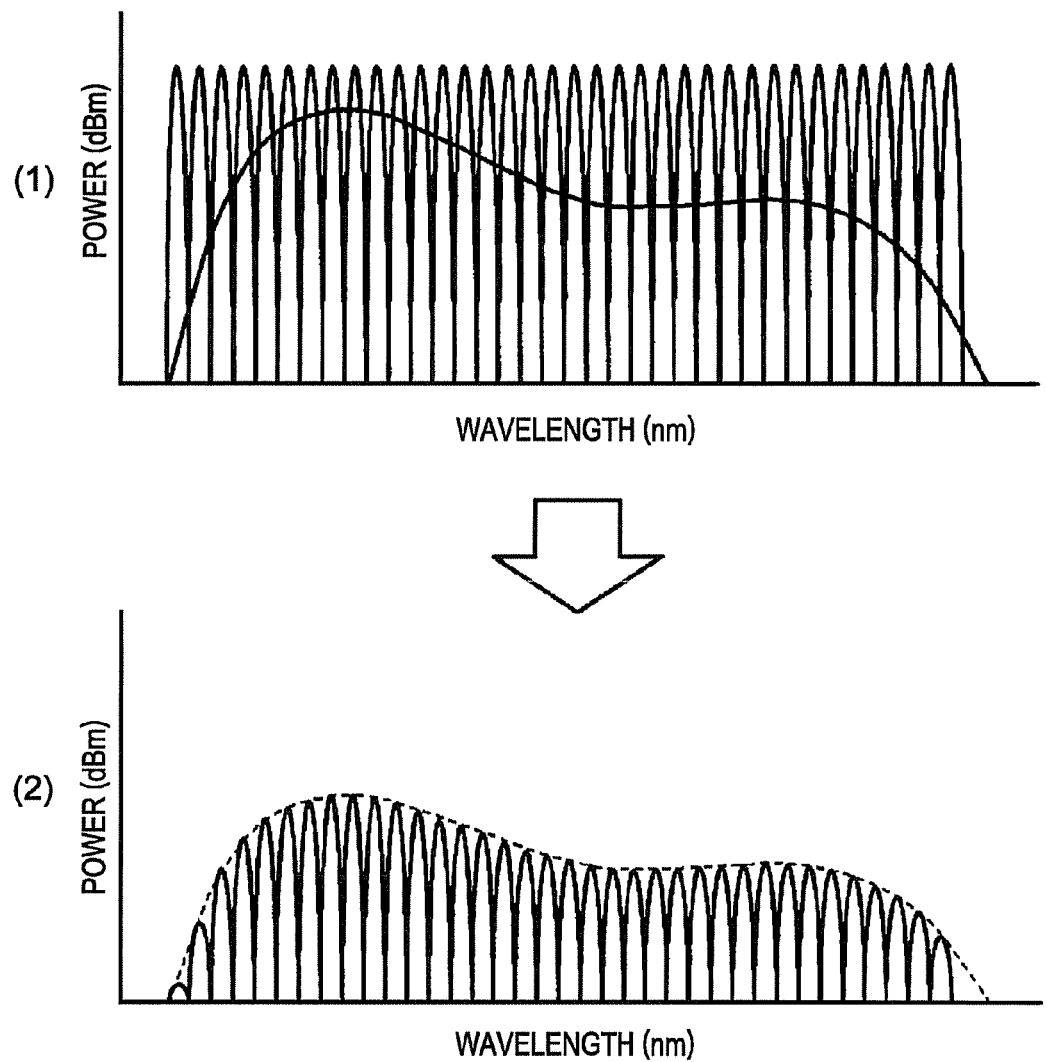
FIG. 13 illustrates a process in which an optical signal containing only ASE light is filtered by a dispersion compensator according to a first exemplary embodiment.
Figure 14:
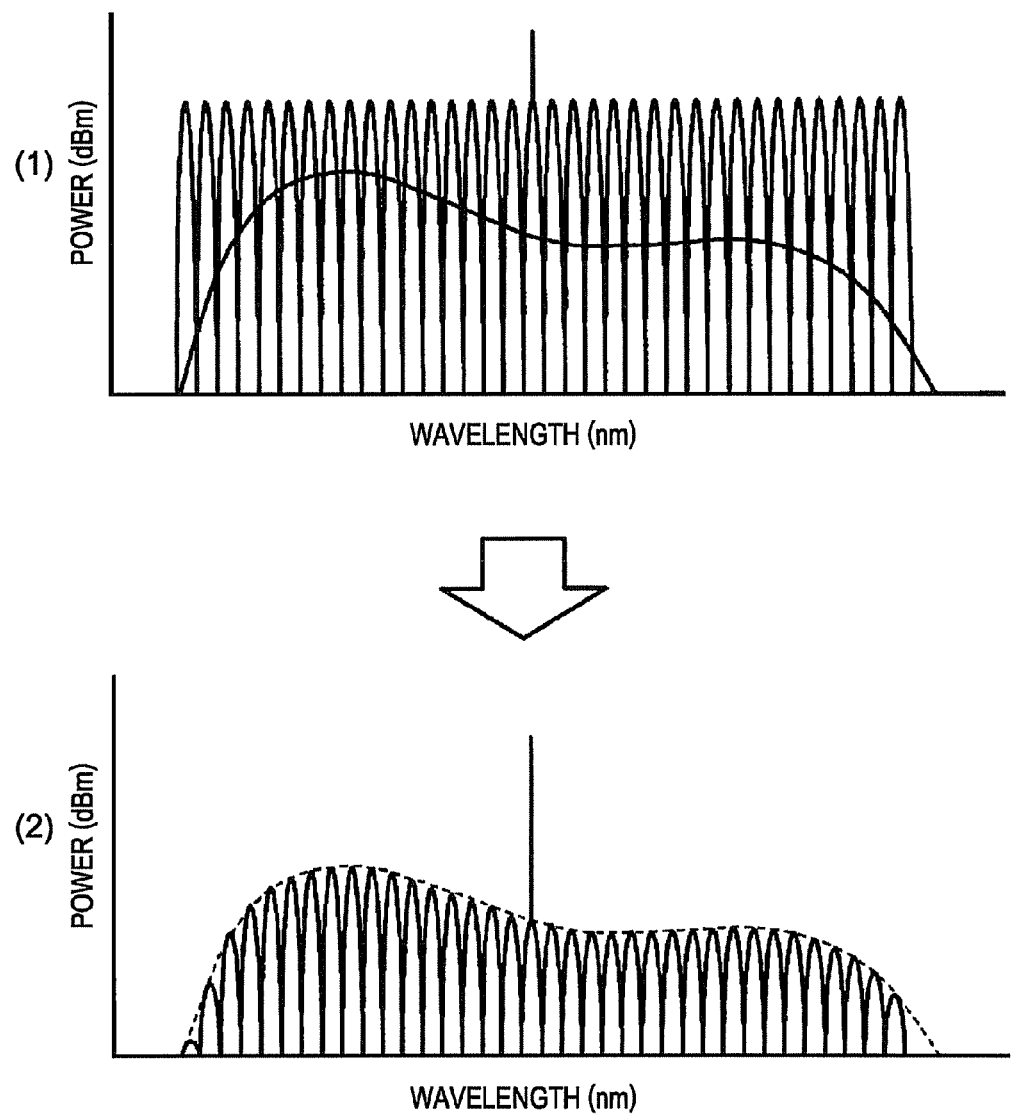
FIG. 14 illustrates a process in which an optical signal containing signal light is filtered by the dispersion compensator according to a first exemplary embodiment.

As shown in FIGS. 13 and 14, the dispersion compensator 202 filters the received optical signal and supplies the corresponding output light to the PreAmp [2] 203. FIG. 13 illustrates a process in which an optical signal containing only ASE light is filtered by the dispersion compensator according to a first exemplary embodiment. Similarly, FIG. 14 illustrates a process in which an optical signal containing signal light is filtered by the dispersion compensator according to a first exemplary embodiment.

FIGS. 13A and 14A each show the filter characteristics of the dispersion compensator 202 and an optical signal received by the PreAmp [1] 201, one superimposed upon the other. The dispersion compensator 202 attenuates the power of the ASE light according to the insertion loss determined for each frequency based on the filter characteristics, and outputs the optical signal, as shown in FIG. 13B or 14B, to the PreAmp [2] 203. For reference, the waveforms of ASE light shown in FIGS. 13A and 14A are indicated by dotted lines shown in FIGS. 13B and 14B respectively.

As shown in FIG. 14, the predetermined frequency whose insertion loss is low in the filter characteristics corresponds to the frequency of the signal light, and, therefore, the dispersion compensator 202 attenuates the signal light by a small degree and then outputs this signal light. As shown in FIGS. 13 and 14, the dispersion compensator 202 attenuates the ASE light according to the insertion loss determined based on the filter characteristics and then outputs this ASE light. In this case, regardless of whether an optical signal contains signal light and ASE light or contains only ASE light, the dispersion compensator 202 attenuates the ASE light in the same manner according to the insertion loss determined based on the filter characteristics. In other words, whether an optical signal contains both signal light and ASE light or only ASE light, the dispersion compensator 202 attenuates the ASE light according to the same insertion loss if the frequencies of the ASE lights are the same.

The dispersion compensator 202, when having received an optical signal containing signal light and ASE light, transmits output light of power greater than that of output light transmitted when the dispersion compensator 202 has received an optical signal containing only ASE light.

Figure 15:
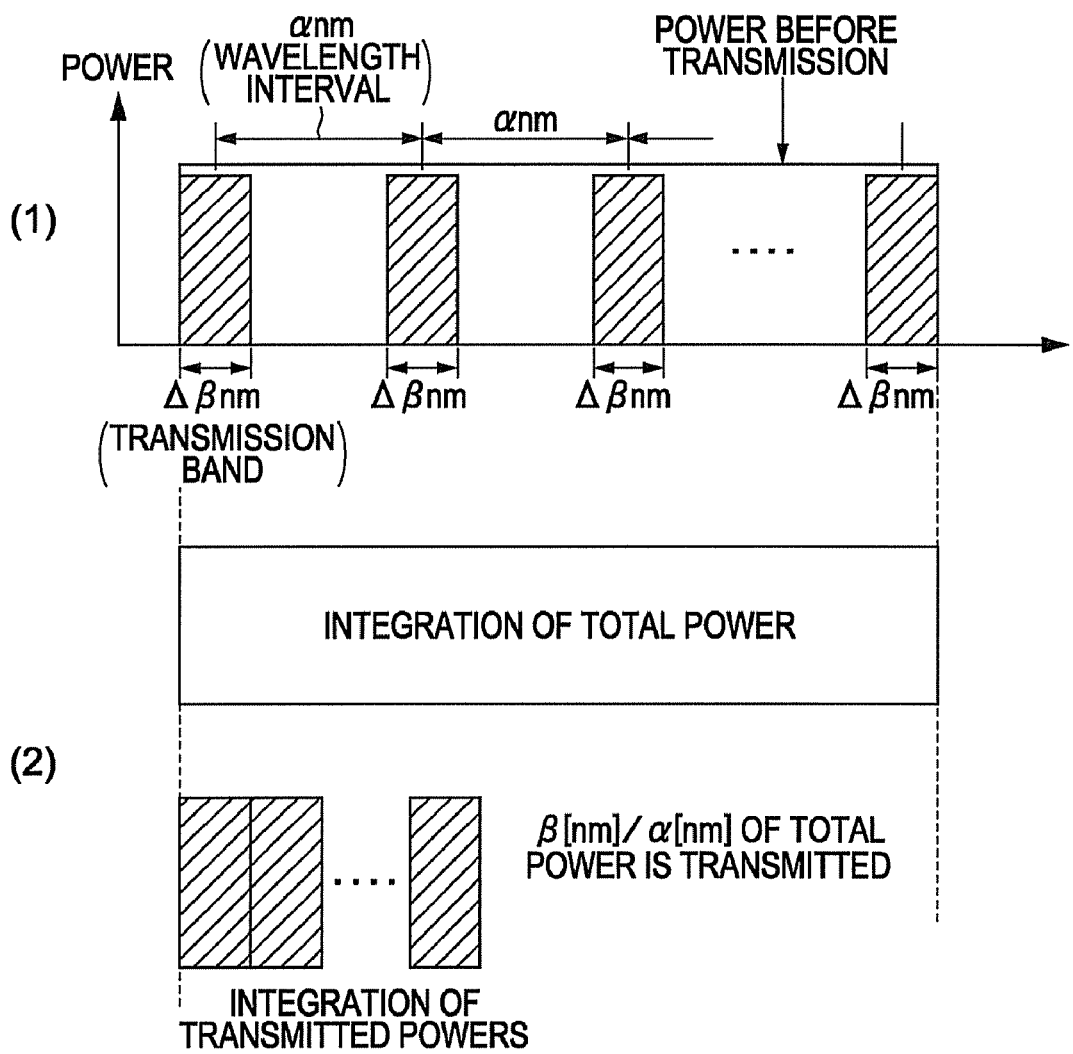
FIG. 15 illustrates the total power of output light supplied from the dispersion compensator in a first exemplary embodiment.

Referring to FIG. 15, the total power of the output light will now be described. FIG. 15 illustrates the total power of output light supplied from the dispersion compensator in a first exemplary embodiment. FIG. 15A shows an optical signal whose power has been attenuated in operations as a result of filtration of the optical signal by the dispersion compensator 202. In FIG. 15, for convenience of explanation, it is assumed that the filter characteristics of the dispersion compensator 202 in FIG. 12 correspond to a wavelength band of β nm at α-nm wavelength intervals, and power is not attenuated in the β nm wavelength band whereas 100% of power is attenuated in wavelength bands outside the β nm wavelength band. As shown in FIG. 15B, the total power of output light is the integral value of the powers of an optical signal. For example, the total power of the output light is β/α of the total power of the unfiltered light to be output.

A specific example will now be described assuming that an optical signal received by the dispersion compensator 202 from the PreAmp [1] 201 contains 20% signal light, and further assuming that the dispersion compensator 202 attenuates light in the range from 10% to 80% (e.g., it attenuates 10% of the power for frequency corresponding to signal light but 40% of the power for the overall ASE light).

For example, where an optical signal received from the PreAmp [1] 201 contains only ASE light, the dispersion compensator 202 attenuates 40% of the power of the overall optical signal through filtering, and accordingly transmits output light of 60% of the power of the light of the received optical signal. Where an optical signal received from the PreAmp [1] 201 contains signal light, on the other hand, the dispersion compensator 202 attenuates 10% of the power of 20% of the signal light, and 40% of the power of 80% of the ASE light. Accordingly, the dispersion compensator 202 transmits output light of 66% (0.2×90%+0.8×60%) of the power of the light of the received optical signal.

Referring to FIG. 16, next will be described a relations between the power of an optical signal received by the PreAmp [1] 201, the power of an optical signal output by the PreAmp [1] 201, and the power of an optical signal received by the PreAmp [2] 203. In FIG. 16, items "PreAmp [1] input," "PreAmp [1] output," and "PreAmp [2] input" are given. The power of signal light received by the PreAmp [2] 203 is equal to the power of an optical signal output by the dispersion compensator 202. FIG. 16 illustrates the power differences between the optical signals in a first exemplary embodiment.

As shown in FIG. 16, at the stage where the PreAmp [1] 201 receives an optical signal, the power of an optical signal containing signal light and the power of an optical signal containing only ASE light may be unequal or equal. In the stage where the PreAmp [1] 201 outputs the optical signal, the power of the optical signal containing signal light and the power of the optical signal containing only ASE light are equal. Further, at the stage where the PreAmp [2] 203 receives the optical signal, the power of the optical signal containing signal light is greater than the power of the optical signal containing only ASE light.

Incidentally, upon receiving a setting for a dispersion value from the NB-MOD 204 via the determination process control section 205, the dispersion compensator 202 attenuates an optical signal according to the setting for the dispersion value, and transmits the attenuated optical signal to the PreAmp [2] 203.

Referring back to FIG. 5, the PreAmp [2] 203 is connected to the dispersion compensator 202 and NB-MOD 204, and compensates for the loss by which the optical signal is attenuated by the dispersion compensator 202. The PreAmp [2] 203 receives an optical signal from the dispersion compensator 202. To be more specific, in the position indicated by (4) in FIG. 6, the PreAmp [2] 203 receives from the dispersion compensator 202 an optical signal attenuated as shown in FIG. 13B or 14B. The PreAmp [2] 203 then amplifies the received optical signal, thereby compensating for the loss brought about by the attenuation conducted by the dispersion compensator 202, and transmits the amplified optical signal to the NB-MOD 204.

The NB-MOD 204 is connected to the PreAmp [2] 203. Upon receiving an optical signal, the NB-MOD 204 determines whether data can be identified and reproduced from the optical signal. Where the data can be identified and reproduced and the optical transmission apparatus has both TX and RX, the NB-MOD 204 converts the optical signal into an electrical signal and transmits the electrical signal to other devices serving as clients. Where the data can be identified and reproduced and the optical transmission apparatus is used as a reproduction relay station, the NB-MOD 204 converts the optical signal to an electrical signal, reconverts this electrical signal into an optical signal, and transmits this optical signal to the Multiplexer 103.

In a first exemplary embodiment, as described below, the determination process control section 205 determines whether an optical signal contains signal light. Therefore, the NB-MOD 204 actually identifies data only when the received optical signal contains signal light.

For example, as a process of determining whether data can be identified and reproduced, the NB-MOD 204 transmits settings for dispersion values to the dispersion compensator 202 from the determination process control section 205. The NB-MOD 204 receives, via the PreAmp [2] 203, each optical signal to which a dispersion value has been assigned by the dispersion compensator 202.

For example, the determination process control section 205 monitors whether each optical signal received by the NB-MOD 204 can be synchronized with a clock signal by unit of a Phase Locked Loop (PLL) circuit. If the optical signal can be so synchronized, it is determined that the optical signal contains signal light. If a determination is further made that data can be identified and reproduced from this signal, the optical signal is converted into an electrical signal.

Next will be described the determination process control section 205. As shown in FIG. 5, the determination process control section 205 has the PD 206 and unit control 207, and controls a process of determining whether an optical signal contains signal light.

The PD 206 is connected to the PreAmp [2] 203 and unit control 207, an example of which is an optical input monitor PD disposed in the PreAmp [2] 203. The PD 206 detects the power of an optical signal output from the dispersion compensator 202 and transmits the detected result to the unit control 207.

The unit control 207 is connected to the PreAmp [2] 203, NB-MOD 204, PD 206, and dispersion compensator 202, and includes a Ref 208, Comp 209, and a Control 210.

The Ref 208 is connected to the Comp 209, and stores a threshold used by the Comp 209 when a comparison is made with the power of output light transmitted by the dispersion compensator 202. For use as a threshold, the Ref 208 stores, for example, the power of an optical signal output from the dispersion compensator 202 when an optical signal containing only ASE light is input to the dispersion compensator 202. For example, the threshold can be obtained by causing the PreAmp [1] 201 to emit light when signal light is not input, and then inputting an optical signal containing only ASE light to the dispersion compensator 202.

The Comp 209 is connected to the PD 206, Ref 208, and Control 210, and compares the power of output light transmitted by the dispersion compensator 202 with the threshold. The Comp 209 compares the power of an optical signal output from the dispersion compensator 202 and then transmitted by the PD 206, with the threshold stored in the Ref 208.

As shown in FIG. 17, if the power of output light is greater than the threshold according to the comparison, the Comp 209 labels the determination as "1," and if the power of output light is below the threshold, it labels the determination as "0." FIG. 17 is a view for explaining "1" and "0" signals output by the Comp 209 in a first exemplary embodiment.

In the example shown in FIG. 17, if "Vref" representing a threshold is greater than "Vmon" representing an optical signal output from the dispersion compensator 202; that is, if the optical signal contains only ASE light, the Comp 209 transmits "0" to the Control 210. If "Vref" is below "Vmon," that is, if the optical signal contains signal light, the Comp 209 transmits "1" to the Control 210.

The Control 210 is connected to the Comp 209, dispersion compensator 202, PreAmp [2] 203, and NB-MOD 204, and controls the dispersion compensator 202, PreAmp [2] 203, and NB-MOD 204 based on the result of the comparison made by the Comp 209.

To be specific, if it receives "1" from the Comp 209 in a case where an optical signal contains signal light, the Control 210 receives a setting for a dispersion value from the NB-MOD 204. Consequently, as indicated by "Dispersion Cont" in FIG. 5, the Control 210 transmits the setting for the dispersion value to the dispersion compensator 202. That is, in the optical reception device 200, the PreAmp [1] 201, dispersion compensator 202, PreAmp [2] 203, and NB-MOD 204 identify data in signal light contained in a received optical signal.

If it receives light containing only ASE light, that is, if it receives "0" from the Comp 209, the Control 210 stops the PreAmp [2] 203 and dispersion compensator 202.

Referring to FIG. 6 and FIGS. 18 to 20, next will be described the power difference between the optical signals detected by the determination process control section 205. That is, a description is given of the power difference (at the stage of output from the dispersion compensator 202) between an optical signal containing only ASE light and one containing ASE light and signal light.

A detailed description is given assuming conditions as shown in FIG. 18. FIG. 18 is a diagram illustrating the specifications of each part, and the power differences between the optical signals. It lists the specifications of the PreAmp [1] 201, De-Multiplexer 102 (labeled "DMUX" in FIG. 18) and dispersion compensator 202 (labeled "VIPA" in FIG. 18).

For example, as for PreAmp [1] 201, "Optical Signal To Noise Ratio (OSNR)" showing the difference between the power of the optical signal and the power of ASE light corresponding to the frequency of the signal light is 20 dB. In addition, in the PreAmp [1] 201, "gain (G)" showing a relation between the optical signal (Pin) received by the PreAmp [1] 201 and the optical signal (Pout) output by the PreAmp [1] 201 is (Pin)×17.5=(Pout).

As for De-Multiplexer 102, the band for each channel is 0.7 nm, and "cross-talk" showing the difference between the power of the optical signal on a current channel and the power of light leaking from another channel is 25 dB. A cross-talk of 25 dB unit that the power of light leaking from another channel is lower by 25 dB than the power of the optical signal on the current channel.

Further, as for the dispersion compensator 202, the band is 0.325 nm, and the filter interval between the predetermined frequencies is 0.8 nm.

A description will now be given assuming that, as shown in FIG. 19, the PreAmp [1] 201 outputs an optical signal containing signal light and ASE light or an optical signal containing only ASE light. FIG. 19 is a diagram illustrating optical signals output from the PreAmp [1], together with the power difference between the optical signals. As shown in FIG. 19, whether an optical signal contains signal light and ASE light or contains only ASE light, the PreAmp [1] 201 outputs an optical signal of predetermined power. In the example in FIG. 19, the PreAmp [1] 201 outputs an optical signal of 6.4 dB.

In this case, assuming that the filter characteristics of the dispersion compensator 202 are those of a simple filter (see FIG. 15), the power of an optical signal output from the dispersion compensator 202 is calculated. If the total power of light output from the dispersion compensator 202 is represented by "P," the filter interval is "α nm," and the transmission band is "β nm," the equation (P)=β/α is satisfied. In this case, the purpose is to calculate the power difference and, therefore, any insertion loss of the filter is not taken into account.

As shown in FIG. 20, the dispersion compensator 202 outputs light of 2.83 dBm power when receiving an optical signal containing only ASE light, whereas it outputs light of 5.51 dBm power when receiving an optical signal containing signal light. That is, there is Δ2.7 dB power difference between when the dispersion compensator 202 receives an optical signal containing only ASE light and when it receives an optical signal containing signal light. FIG. 20 is a diagram illustrating optical signals output from the dispersion compensator, together with the power difference between the optical signals.

Figure 21:
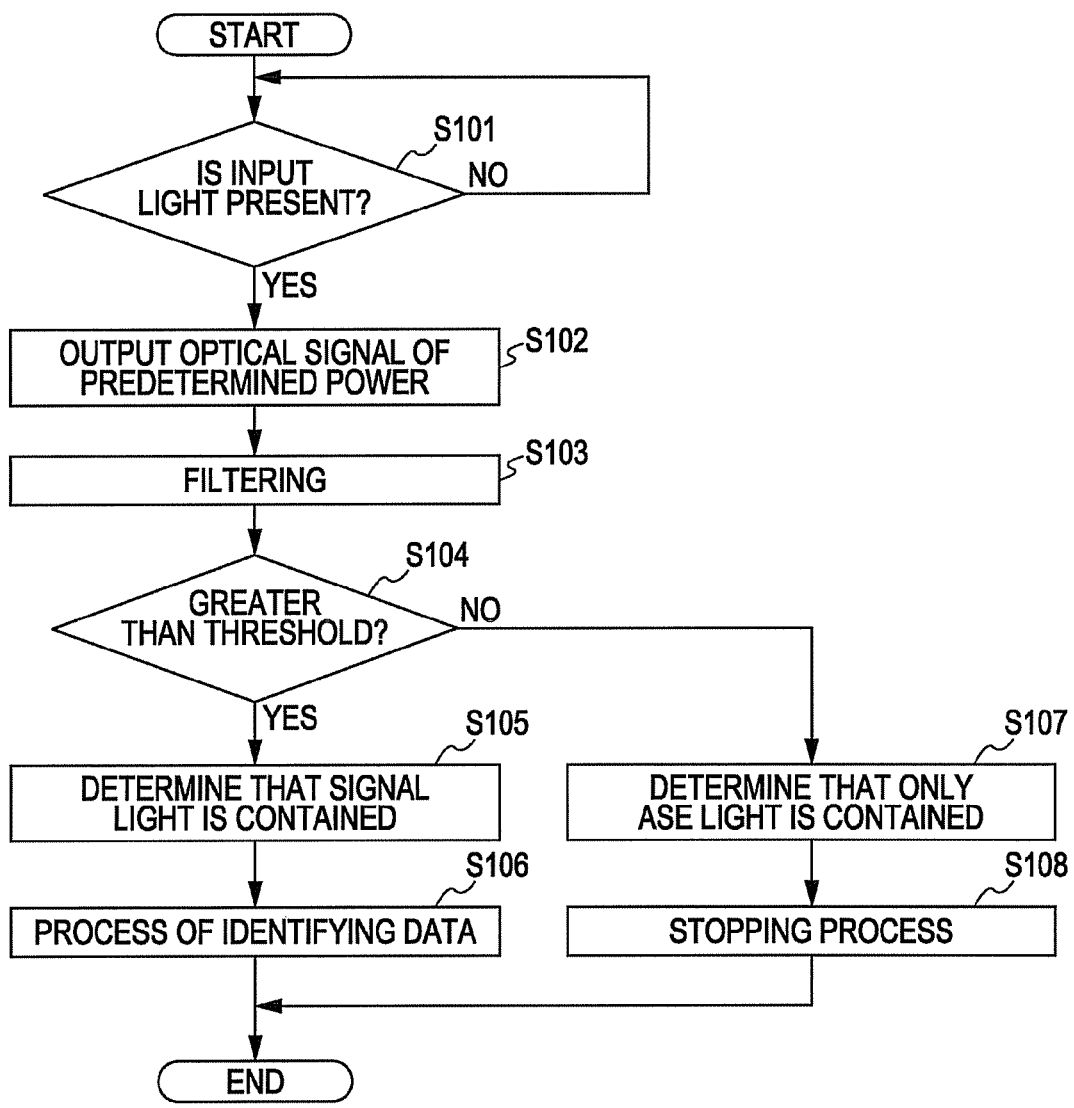
FIG. 21 illustrates an example of a processing flow carried out by the optical transmission/reception device according to a first exemplary embodiment.

Next, a processing carried out by each of the optical transmission/reception devices 200 will be described with reference to FIG. 21. FIG. 21 illustrates an example of the flow of a processing carried out by an optical transmission/reception device according to a first exemplary embodiment.

As shown in FIG. 21, if input light is present (Yes, in operation S101), that is, if the optical transmission/reception device 200 receives an optical signal, the PreAmp [1] 201 outputs an optical signal of predetermined power (operation S102). The PreAmp [1] 201 amplifies the power of the optical signal received by the optical transmission/reception devices 200 to a predetermined power, and transmits this amplified signal to the dispersion compensator 202.

The dispersion compensator 202 filters the optical signal of predetermined power output by the PreAmp [1] 201 (operation S103). Specifically, using filter characteristics where the degree of attenuation of the power of an optical signal containing signal light is lower than the degree of attenuation of the power of an optical signal containing no signal light, the dispersion compensator 202 filters the received optical signal and outputs this light.

In the determination process control section 205, the Comp 209 compares the threshold and the power of light output from the dispersion compensator 202 (operation S104). If the power is greater than the threshold (Yes in operation S104), the Comp 209 determines that the optical signal contains signal light (operation S105). The Control 210 initiates identification of the data (operation S106). The Control 210 transmits a setting for a dispersion value to the dispersion compensator 202. The dispersion compensator 202 and the NB-MOD 204 identify the data from the received optical signal.

In the determination process control section 205, if the power is less than the threshold (No, in operation S104), the Comp 209 determines that the optical signal contains only ASE light (operation S107). The Control 210 performs a stopping process (operation S108). The Control 210 shuts off the PreAmp [2] 203 and NB-MOD 204.

As described above, according to a first exemplary embodiment, in the optical transmission/reception device 200, the dispersion compensator 202 receives and filters an optical signal of predetermined power and outputs the filtered light. Subsequently, the determination process control section 205 compares the power of the light output from the dispersion compensator 202 with a given threshold. If the power of the output light is greater than the threshold, the determination process control section 205 determines that the optical signal contains signal light, and if not, it determines that the optical signal contains no signal light. Thus, the optical transmission/reception device 200 is able to correctly determine whether an optical signal contains signal light.

To be specific, the optical transmission/reception device 200 can ensure correct determination of the presence or absence of signal light without requiring a process for reproduction and identification of data from an optical signal, which is followed by a process for determining, if the signal is reproduced and identified, whether the signal contains signal light.

Accordingly, the optical transmission/reception device 200 yields the following effects: (1) the lives of any operating components included in the dispersion compensator can be extended; (2) consumption of power can be minimized; and (3) surges can be prevented.

The effect (1), in which the life of the dispersion compensator can be extended, will now be discussed in detail. For example, where the dispersion compensator 202 is of VIPA type, the operating distance of a three-dimensional sculptured-surface mirror within the VIPA has an upper limit. Unlike a method for the reproduction and identification of data by the constant operation of a three-dimensional sculptured surface mirror, the optical transmission/reception device 200 can determine, from the power difference in output light, whether an optical signal contains signal light. This makes it possible for the optical transmission/reception device 200 to reduce the operating distance of the three-dimensional sculptured surface mirror within the VIPA, thus extending the life of the VIPA.

Next will be discussed in detail the effect (2), in which consumption of power can be minimized. Unlike a method requiring a process for reproduction and identification of data, the optical transmission/reception device 200 can determine the presence or absence of signal light based on the power difference in the overall light output from the dispersion compensator 202. If an optical signal contains no signal light, the excitation of the heater of the dispersion compensator and the PreAmp [2] 203 and the NB-MOD 204 can be stopped, thus reducing power consumption.

Next will be discussed in detail the effect (3), in which surges are prevented. For example, the PreAmp [2] 203 monitors the presence or absence of an optical signal and, if light has not been input, the PreAmp [2] 203 stops the output of an excitation Laser Diode (Pump LD) incorporated in the PreAmp [2] 203 in order to prevent any surge, protect components, and reduce consumption of current. When light is input again, the PreAmp [2] 203 operates the excitation LD, thereby amplifying the light to a specific output level.

A conventional PreAmp [2] cannot distinguish between ASE light and signal light and, hence, cannot activate an OFF control for the excitation LD either, which requires to amplify light even where an optical signal contains only ASE light. In this case, when an optical signal containing only ASE light is replaced by an optical signal containing signal light, the power of the optical signal received by the PreAmp [2] may change significantly, leading to a surge in output from the PreAmp [2]. Consequently, the NB-MOD may be damaged depending on the level of the surge.

The optical transmission/reception device 200 according to a first exemplary embodiment can shut off the PreAmp [2] 203 and NB-MOD 204 upon determining that an optical signal contains only ASE light. Accordingly, the device 200 can avoid any surges that may arise when an optical signal containing only ASE light is replaced by an optical signal containing signal light.

Figure 22:
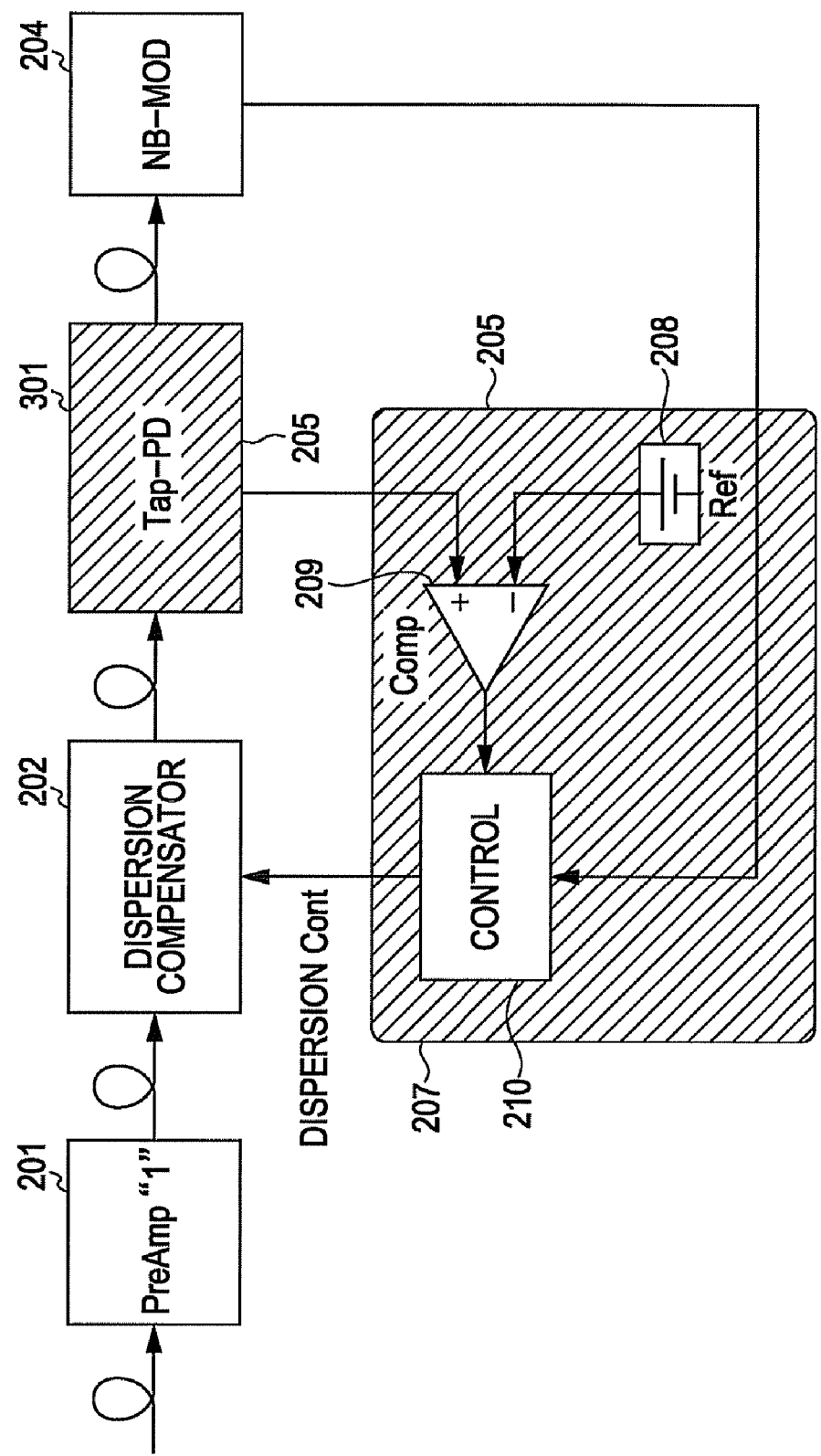
FIG. 22 is a block diagram of illustrates an exemplary optical transmission/reception device that uses a Tap-PD.
Figure 23:
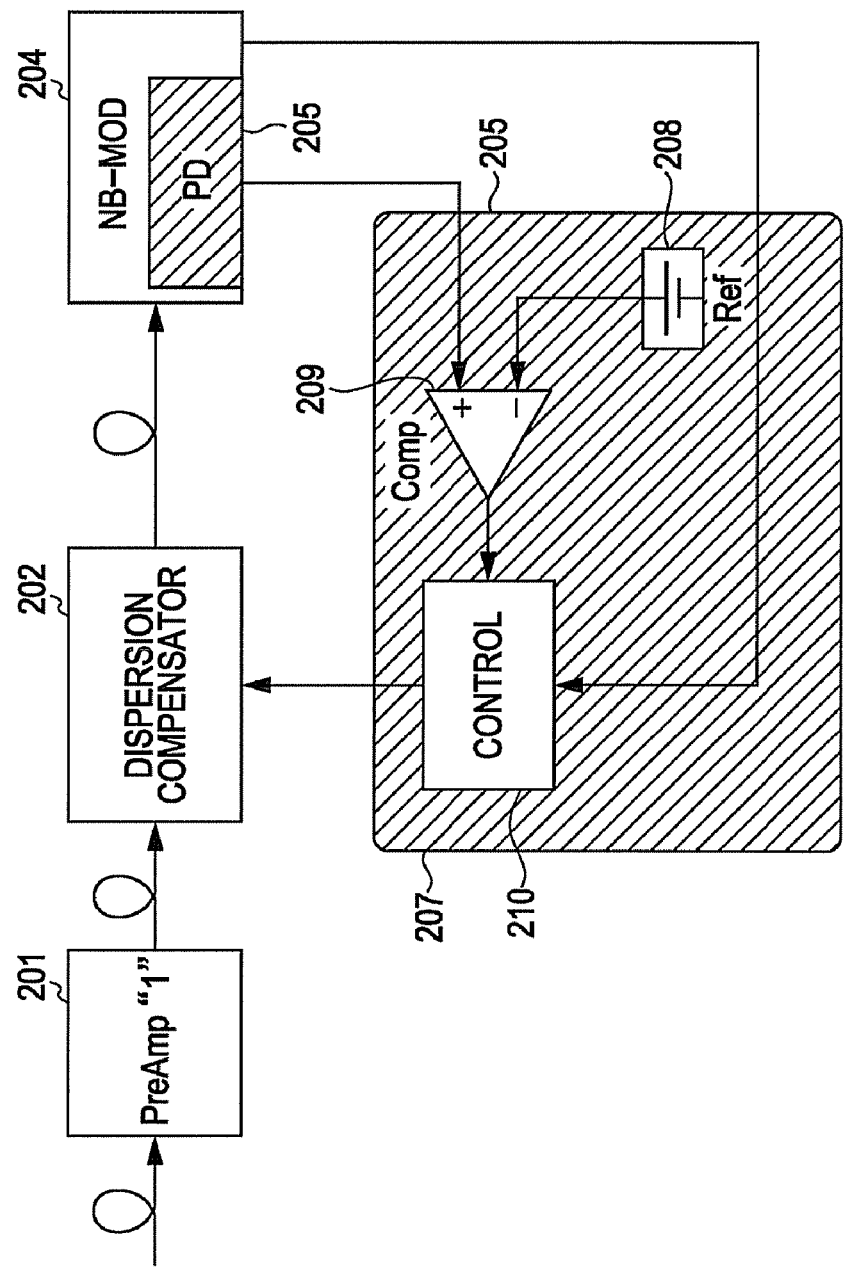
FIG. 23 is a block diagram of illustrates an exemplary optical transmission/reception device that uses a monitoring PD incorporated in an NB-MOD 204.
Figure 24:
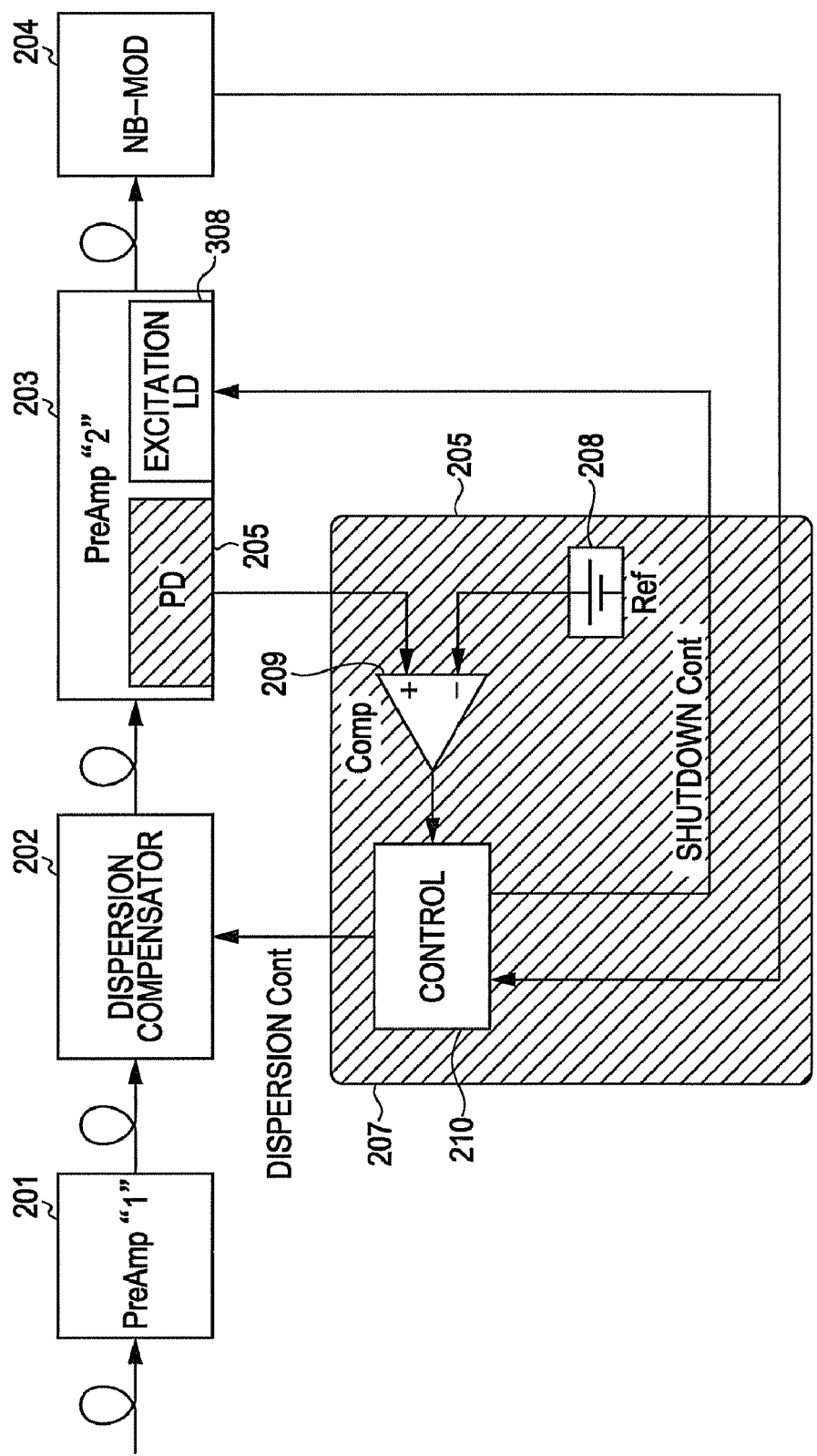
FIG. 24 illustrates an exemplary optical transmission/reception device in a case where an excitation LD is stopped.

A first exemplary embodiment has been described assuming that each of the optical transmission/reception devices 200 has, as shown in FIG. 5, the PreAmp [2] 203, which incorporates the PD 206. However, the exemplary embodiments are not limited to this configuration. Referring to FIGS. 22 to 24, only those features of the configuration of each of the optical transmission/reception devices 200 according to the second embodiment different from those in a first exemplary embodiment, as shown in FIG. 5, will be described.

As shown in FIG. 22, an optical transmission/reception device 200 that does not include the PreAmp [2] 203 may use, for example, a Tap-PD 301. FIG. 22 is a block diagram of an exemplary optical transmission/reception device that uses the Tap-PD.

The Tap-PD 301 is connected to the dispersion compensator 202 and the NB-MOD 204. The Tap-PD 301 receives light output from the dispersion compensator 202, and transmits the received optical signal to the NB-MOD 204. In addition, when receiving the optical signal output from the dispersion compensator 202, the Tap-PD 301 detects the entire power of the optical signal and transmits the detected result to the unit control 207. Thus, without requiring that the PreAmp [2] 203 incorporate a PD 206, the optical transmission/reception device can detect the power of the light output from the dispersion compensator 202.

In addition, as shown in FIG. 23, an optical transmission/reception device 200 that includes no PreAmp [2] 203 may use, for example, a monitoring PD incorporated in the NB-MOD 204. FIG. 23 is a block diagram of an exemplary optical transmission/reception device that uses a monitoring PD incorporated in an NB-MOD 204.

That is, in an example shown in FIG. 23, when receiving an optical signal output from the dispersion compensator 202, the monitoring PD in the NB-MOD 204 detects the power of the optical signal, and transmits the detected result to the unit control 207. Thus, the optical transmission/reception device 200 can detect the power of the optical signal output from the dispersion compensator 202 without requiring that the PreAmp [2] 203 incorporate a PD 206 and without incorporating an additional PD.

As shown in FIG. 24, in the optical transmission/reception device 200 according to a first exemplary embodiment, the Control 210 stops the PreAmp [2] 203 if it is determined that an optical signal contains only ASE light. However, the Control 210 may stop an excitation LD 308 incorporated in the PreAmp [2] 203. FIG. 24 is a block diagram of an exemplary optical transmission/reception device in a case where the excitation LD 308 is stopped.

As shown FIG. 24, the Control 210 is connected to the excitation LD 308 incorporated in the PreAmp [2] 203. If a determination is made that an optical signal contains only ASE light, the Control 210 stops the excitation LD 308 in the PreAmp [2] 203. Thus, the optical transmission/reception device 200 can reduce consumption of current and can also prevent surges when receiving an optical signal containing signal light. In addition, the optical transmission/reception device 200 may stop the excitation LD 308 and NB-MOD 204 and supply power to the PreAmp [2] 203, thus enabling by unit of, for example, a PD incorporated in the PreAmp [2] 203 detection of the power of the output light.

Third Exemplary Embodiment

The embodiments have been described assuming that the determination process control section 205 does not control the filter characteristics used by the dispersion compensator 202 but uses a method in which the power of light output from the dispersion compensator 202 and the threshold are compared. However, the exemplary embodiments are not limited to this method. The presence or absence of signal light may be determined using the power difference in the output light, which power difference is made by controlling the filter characteristics of the dispersion compensator 202.

To be specific, using filter characteristics where the degree of attenuation of the power of an optical signal of predetermined frequency is lower than the degree of attenuation of the power of an optical signal of another frequency, the dispersion compensator 202 filters the optical signal. Generally, the predetermined frequency is the frequency of signal light. In the filter characteristics, the degree of attenuation of the power of an optical signal of predetermined frequency is lower than the degree of attenuation of the power of an optical signal of another frequency.

For example, the filter characteristics may be controlled so as to change the predetermined frequency. In this case, if an optical signal contains signal light, the predetermined frequency becomes higher than that before the degree of attenuation of the signal light is changed. Consequently, the power of output light approaches a lower value. In comparison, if the optical signal contains only ASE light, there is barely any change in the power of the output light.

Referring to FIGS. 25 to 29, next will be described, as a third exemplary embodiment, a method using the power difference in output light, which difference is made by controlling the filter characteristics used by the dispersion compensator 202. The description of the features that are the same as those of the optical transmission/reception device according to a first exemplary embodiment will be omitted.

Figure 25:
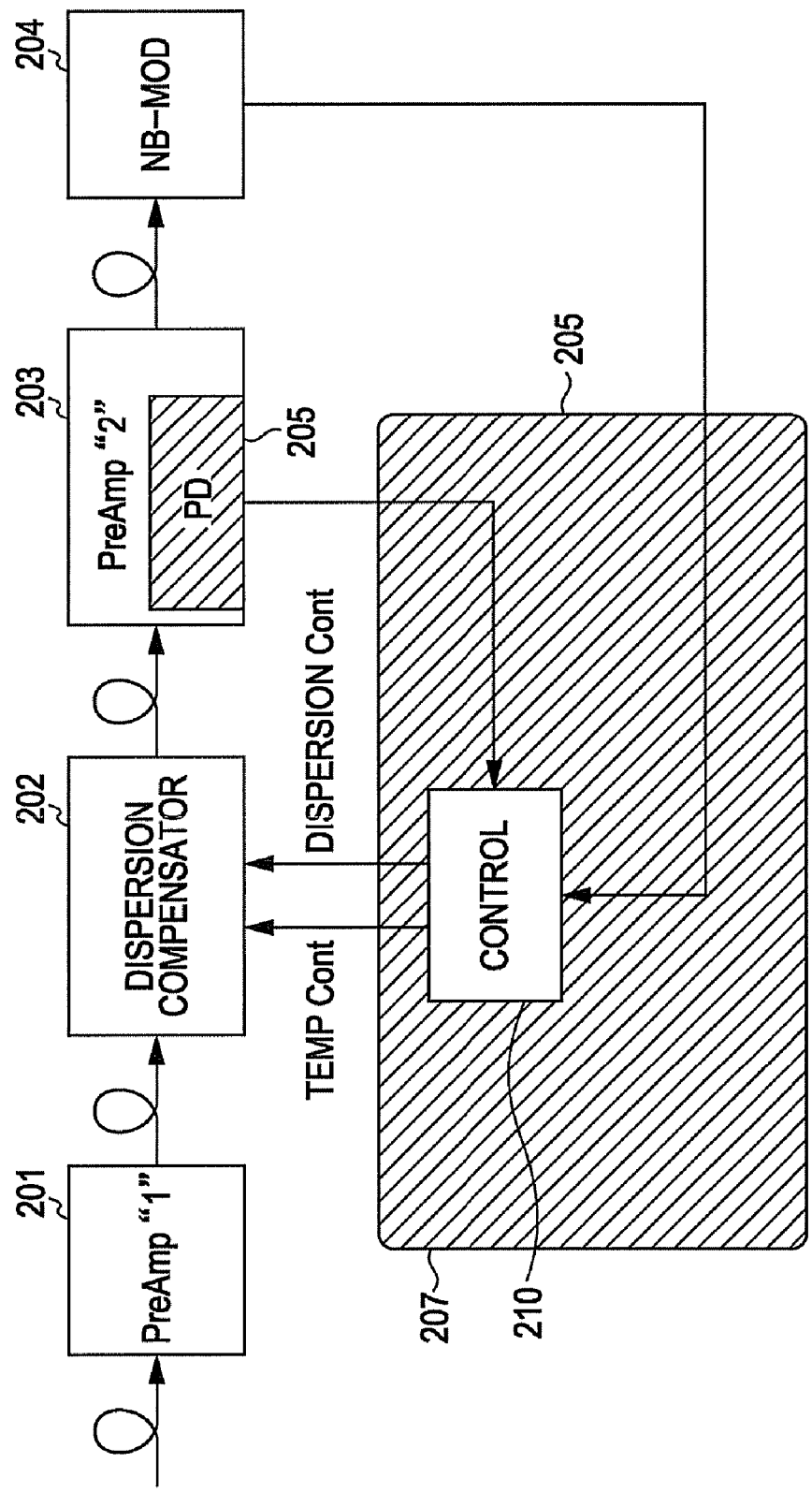
FIG. 25 illustrates an exemplary optical transmission/reception device according to a third exemplary embodiment.

As shown in FIG. 25, an optical transmission/reception device 200 in the third exemplary embodiment has the same configuration as the optical transmission/reception device 200 in a first exemplary embodiment. FIG. 25 is a block diagram of an example of the configuration of the optical transmission/reception device according to the third exemplary embodiment. A description is given assuming that the Control 210 includes the Comp 209 and Ref 208 described in a first exemplary embodiment.

The dispersion compensator 202 is connected to the Control 210, and the filter characteristics are controlled by the Control 210. Here, a description is given where the dispersion compensator 202 is of VIPA type. Generally, the temperature of the VIPA may be controlled so that a wave-guide has a fixed temperature by unit of a heater or Peltier. Additionally, in the VIPA, the center wavelength is adjusted by the temperature control of the VIPA plate (i.e., glass). Changing the temperature of the VIPA plate enables a change in a predetermined frequency. That is, as "Temp Cont" indicates in FIG. 25, the Control 210 transmits temperature control information to the dispersion compensator 202 to control the temperature, and changes the predetermined frequency of the filter characteristics used by the dispersion compensator 202. The predetermined frequency will hereinafter be referred to as center wavelength (i.e., transmission wavelength).

Figure 26:
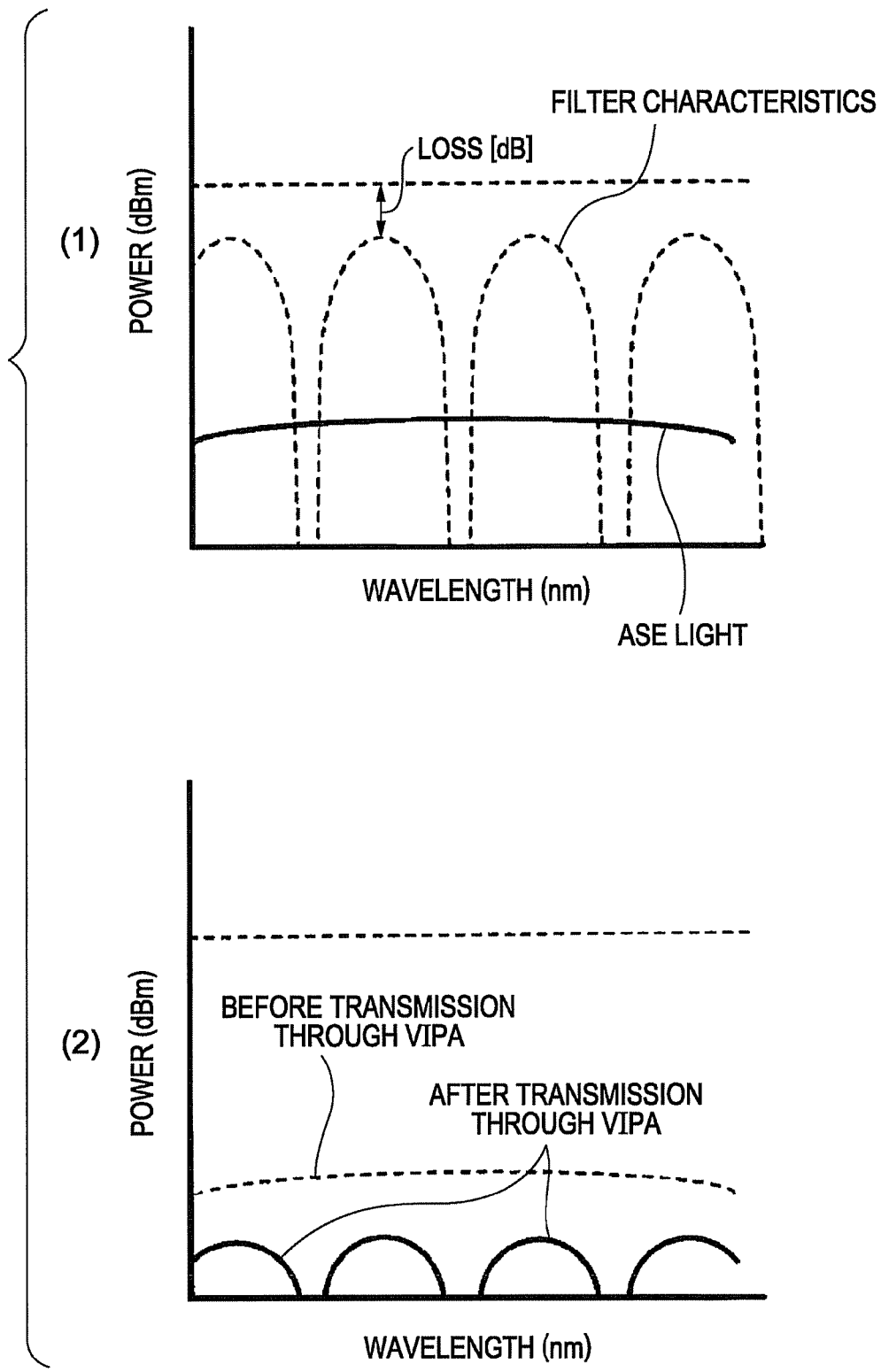
FIG. 26 illustrates the power of output light containing only ASE light in a case where a center wavelength changes.
Figure 27:
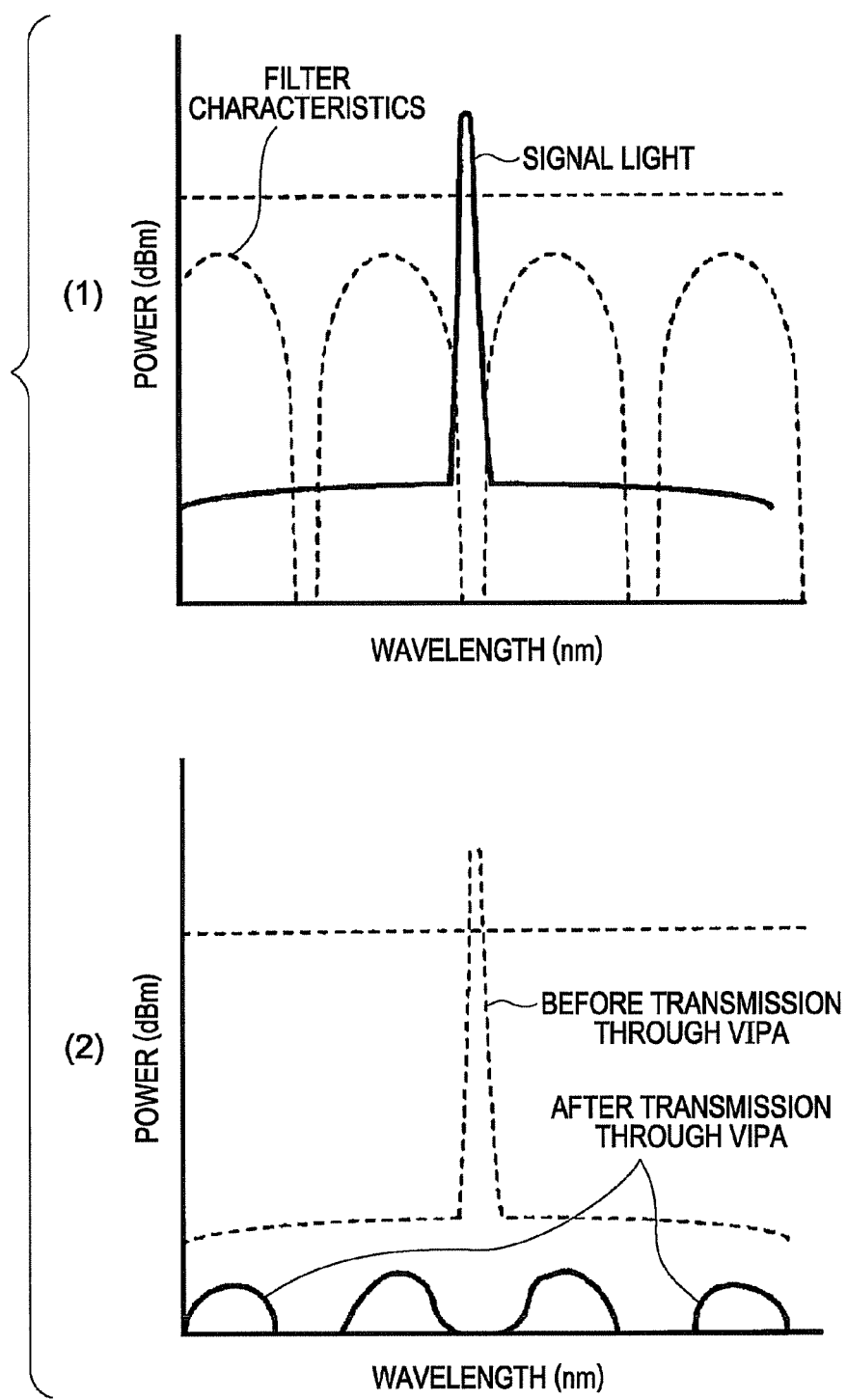
FIG. 27 illustrates the power of output light containing signal light in a case where the center wavelength changes.

The difference between the powers of the output light in a case where the center wavelength is changed will now be described with reference to FIGS. 26 and 27. FIGS. 26 and 27 respectively illustrate the power of output light containing only ASE light and that containing signal light where the center wavelength is changed.

As shown in FIG. 26A, the output light containing only ASE light has wavelength characteristics where powers are equal over a wide band since signal light is absent. Therefore, as shown in FIG. 26B, even if the center wavelength is shifted, the dispersion compensator 202 outputs an optical signal the power of which is very close to that of an optical signal output before the center wavelength was shifted.

Where output light contains signal light, on the other hand, the proportion of signal light in the optical signal is large, and hence the proportion of signal light compared to light output from the dispersion compensator 202 is also large. As shown in FIG. 27A, by shifting the center wavelength, if signal light is shifted together with the center wavelength, its power is greatly attenuated. Consequently, as shown in FIG. 27B, the dispersion compensator 202 outputs an optical signal the power of which has been greatly changed compared to the power of the optical signal output before the center wavelength was shifted. The power of the optical signal markedly changes so as to approach a smaller value. "To markedly change" unit that the change is great compared to the change in power of an optical signal containing only ASE light.

A further description is given using a detailed example. The description is given assuming: that an optical signal received from the PreAmp [1] 201 contains 20% signal light; that the dispersion compensator 202 attenuates light in the range of 10% to 80% (for example, 10% power is attenuated at a frequency corresponding to signal light and 40% power is attenuated at a frequency corresponding to ASE light; and that the Control 210 shifts the center wavelength, thereby attenuating 80% power at the frequency corresponding to signal light, that is, the Control 210 shifts the center wavelength such that the dispersion compensator 202 attenuates the highest proportion of power at the frequency corresponding to signal light, as shown in FIG. 27A.

For example, where an optical signal received from the PreAmp [1] 201 contains only ASE light, the dispersion compensator 202 attenuates 40% power of the optical light by filtering, and outputs light of 60% of the power of the optical signal when that was received. On the other hand, if an optical signal received from the PreAmp [1] 201 contains signal light and ASE light, the dispersion compensator 202 attenuates 80% power of 20% signal light and 40% power of 80% ASE light. Consequently, the dispersion compensator 202 outputs light of 52% (0.2×80%+0.8×60%) of the power of the optical signal when that was received.

Referring back to FIG. 25, when light is output from the dispersion compensator 202, the PD 206 transmits the power of the output light to the Control 210.

The Control 210 manipulates the filter characteristics such that the dispersion compensator 202 supplies a first output light filtered using filter characteristics where the frequency of the center wavelength is the same as that of the signal light. The Control 210 manipulates the filter characteristics such that the dispersion compensator 202 supplies a second output light filtered using filter characteristics where the frequency of the center wavelength is different from that of the signal light. The Control 210 also manipulates the filter characteristics of the dispersion compensator 202 such that the first and second lights are output one after the other.

For example, when receiving the power of the first light output from the PD 206, the Control 210 changes the center wavelength by controlling the temperature of the VIPA plate of the dispersion compensator 202. The power of the output light received from the PD 206 subsequent to this change is set as the power of the second output light.

The Control 210 calculates the power difference between the first and second output lights supplied by the dispersion compensator 202 one after the other, and compares the difference thus calculated with a given threshold. If the power difference between the first and second output lights is greater than the threshold, the Control 210 determines that the optical signal contains signal light, and if not, it determines that the optical signal contains no signal light. The threshold used in the third exemplary embodiment is, for example, the power difference between the first output light and the second output light of an optical signal containing only ASE light.

Figure 29:
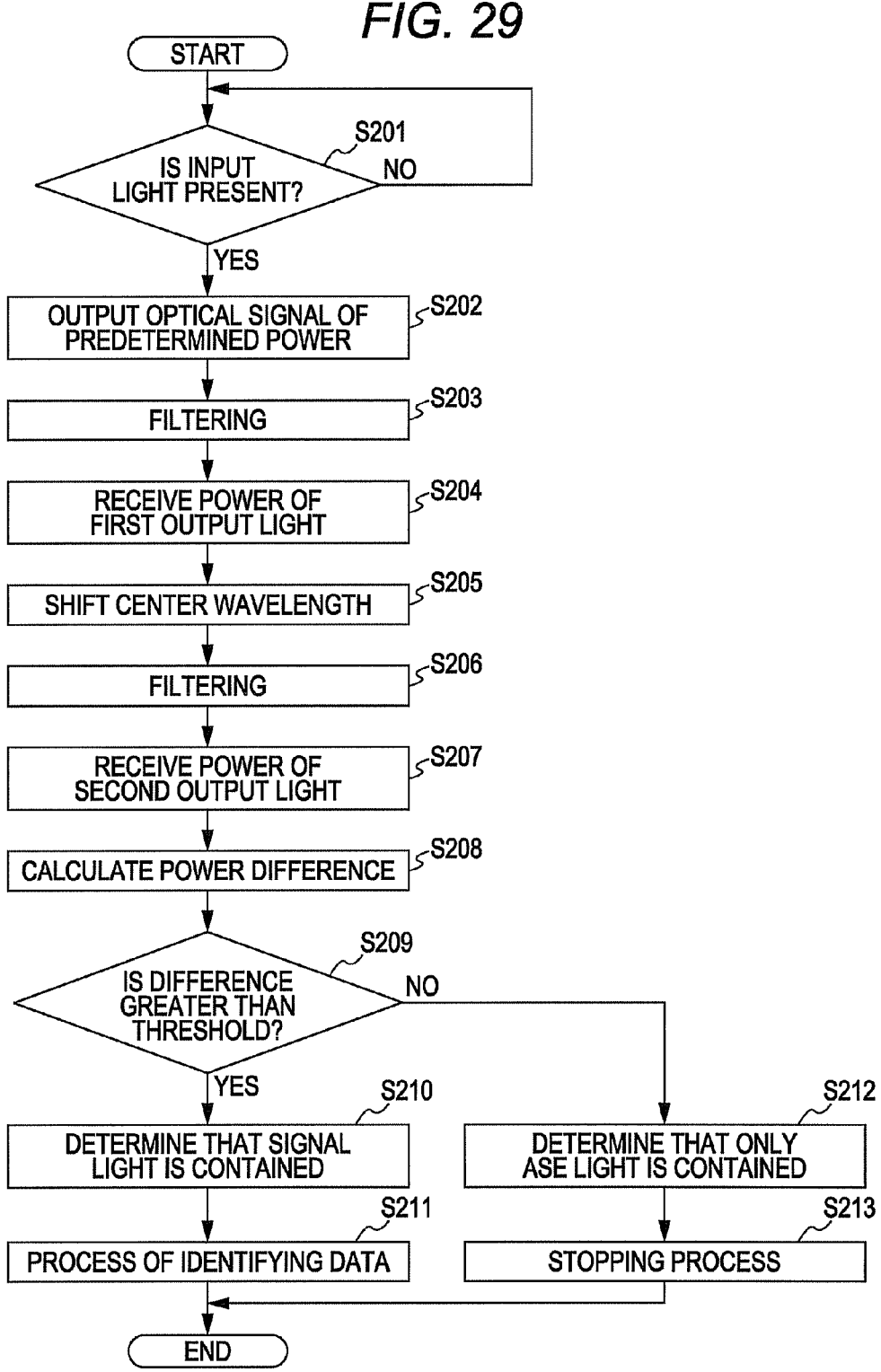
FIG. 29 illustrates an example of a processing flow carried out by the optical transmission/reception device according to the third exemplary embodiment.

As shown in FIG. 28, the Control 210 compares the power in a case where the center wavelength is changed (corresponding to "changed" in FIG. 28), with a reference that is the power in a case where the center wavelength corresponds to the signal light (corresponding to "not changed" in FIG. 28). If the power has the same level, the Control 210 determines that the optical signal contains only ASE light. If the power of the optical signal markedly approaches a smaller power, the Control 210 determines that the optical signal contains signal light. FIG. 28 is a diagram for explaining the presence or absence of change in the center wavelength, together with the power difference in output light.

third exemplary embodiment Referring to FIG. 29, next will be described a processing carried out by each of the optical transmission/reception devices 200 according to the third exemplary embodiment. FIG. 29 illustrates an example of the flow of a processing carried out by the optical transmission/reception device according to the third exemplary embodiment.

In the optical transmission/reception device in the third exemplary embodiment, as shown in FIG. 29, if input light is present (Yes in operation S201) and an optical signal of predetermined power is output (operation S202), the dispersion compensator 202 filters the optical signal (operation S203). The Control 210 receives the power of the first output light from the PD 206 (operation S204).

The Control 210 shifts the center wavelength (operation S205). To be specific, the Control 210 manipulates the filter characteristics of the dispersion compensator 202 such that the dispersion compensator 202 outputs a second light filtered using filter characteristics where the frequency of the center wavelength is different from that corresponding to signal light.

Subsequently, the dispersion compensator 202 filters the first output light (operation S206), and the Control 210 receives the power of the second output light from the PD 206 (operation S207).

The Control 210 calculates the power difference (Operation S208). That is, the Control 210 calculates the difference between the power of the first output light and the power of the second output light. The Control 210 then determines whether the difference is greater than the threshold (operation S209). If the power difference is greater than the threshold (Yes in operation S209), the Control 210 determines that the optical signal contains signal light, and proceeds to the following operations 210 and 211. If the power difference is smaller than the threshold (No in operation S209), the Control 210 determines that the optical signal contains no signal light and terminates a processing (operations S212 and 213).

Operation S201 in FIG. 29 corresponds to operation 8101 in FIG. 21. Operation S202 in FIG. 29 corresponds to operation S102 in FIG. 21. Operation S203 and S206 in FIG. 29 correspond to operation S103 in FIG. 21. Operations S210 and S211 in FIG. 29 correspond to operations S105 and 8106, respectively, in FIG. 21. Operations S212 and S213 in FIG. 29 correspond to operations S107 and S108, respectively, in FIG. 21.

third exemplary embodiment In the third exemplary embodiment, as described above, each of the optical transmission/reception devices 200 can correctly determine whether an optical signal contains signal light by shifting the center wavelength. The optical transmission/reception device 200 can determine the presence or absence of signal light without performing a process of reproduction and identification of data from an optical signal.

As well as the exemplary embodiments heretofore described, it should be understood that the present invention may be embodied in manners different from those described above. Below are descriptions of exemplary embodiments.

Figure 30:
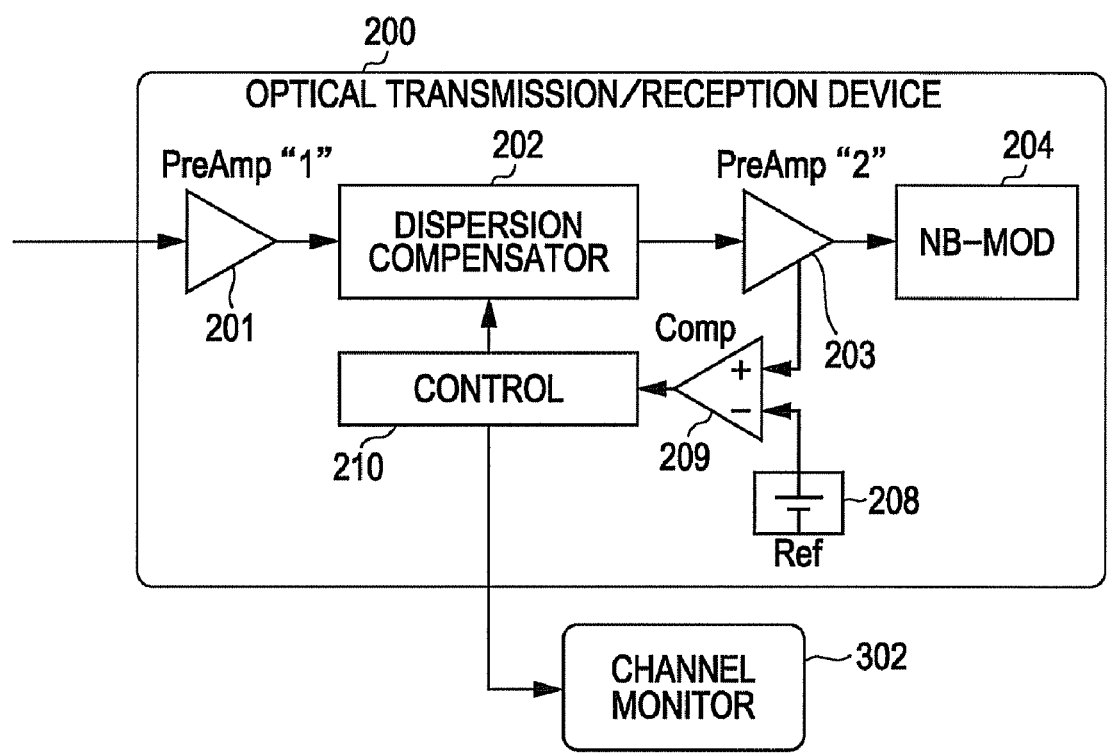
FIG. 30 illustrates an exemplary optical transmission/reception device used as an operation channel monitor.

For example, each optical transmission/reception device 200 may be used as an operation channel monitor, as shown in FIG. 30. FIG. 30 is a block diagram of an exemplary optical transmission/reception device used as an operation channel monitor. An operation channel unit a channel containing signal light. An operation channel monitor unit a device that outputs information about an operation channel.

As shown in FIG. 30, the optical transmission/reception device 200 further includes a Channel Monitor 302. The Control 210 is connected to the Channel Monitor 302. Upon receiving information about an operation channel from the Comp 209, the Control 210 transmits the information received to the Channel Monitor 302. That is, the Control 210 transmits to the Channel Monitor 302 information about whether an optical signal contains signal light or only ASE light.

Figure 31:
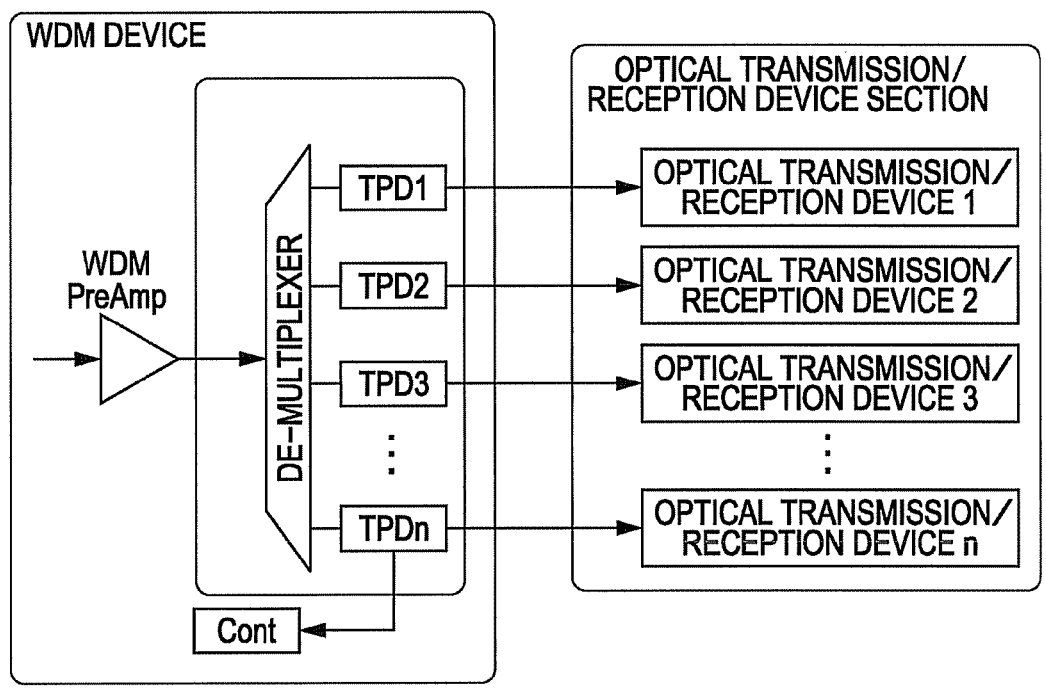
FIG. 31 illustrates ah optical transmission apparatus used as an operation channel monitor.

FIG. 31, for example, a monitor is provided for each channel to which an optical signal is output from the De-Multiplexer 102, and a spectrum analyzer is additionally provided for each channel (labeled as "TPD1" to "TPDn" in FIG. 31). Using the corresponding monitor, each spectrum analyzer determines whether the channel is operating. The spectrum analyzer then outputs information about the operation channel to the Cont shown in FIG. 31. Then, for example, the Cont outputs this information to the optical transmission apparatus on the transmission side. FIG. 31 illustrates a conventional optical transmission apparatus used as an operation channel monitor.

If an optical signal contains only ASE light, the optical transmission/reception device 200 shown in FIG. 30 determines that signal light has not been input to the optical transmission/reception device 200 and that a channel has not been operating either. If an optical signal contains signal light, the optical transmission/reception device 200 determines that signal light has been input to the optical transmission/reception device 200 and that a channel has been operating. That is, using Channel Monitor 302, information received from the Control 210 is output to the optical transmission apparatus on the transmission side. This eliminates the need for the optical transmission/reception device 200 to have a monitor for each channel in order to output information about an operation channel, or to have a spectrum analyzer either.

If a determination is made that an optical signal contains signal light and that a channel has been operating, the Channel Monitor 302 may additionally display, as information about an operation channel, wavelength information about this channel. That is, the wavelength for an optical signal input to each channel has been set and this wavelength may be displayed by the Monitor 302.

Further, the Channel Monitor 302 may detect a wrong number of channels. The Channel Monitor 302 compares the number of operation channels that have actually been operating in the transmission apparatus, with the number of operating channels in a different transmission apparatus, which latter number has been obtained by monitoring control signal light received from or transmitted to the different optical transmission apparatus. If the numbers are not equal, it may be determined that the number of wavelengths is wrong.

To minimize the occurrence of Spectral-Hole Burning (SHB), for example, if the Control 210 of the optical transmission/reception device 200 detects a wavelength (or frequency) deviation, it may manipulate the optical amplifier or gain equivalent device of the optical transmission/reception device 200, thereby correcting this deviation. That is, the wavelength characteristics may be flattened.

Specifically, if a determination is made that an optical signal contains signal light, deviation of the signal light from the predetermined wavelength may be detected and corrected.

Where an optical amplifier is included in the WDM device, a part of the wavelength of a multiplexed optical signal might deviate toward the short or long wavelength side. This may lead to spectral-hole burning, which is a physical phenomenon. Spectral-hole burning may result in tilt in wavelength characteristics and hence SN ratio deteriorates. The tilt accumulates each time optical transmission is carried out between the WDM devices. That is, it is important to prevent gain deviation caused by spectral-hole burning. In a conventional method, a monitor has been provided for each spectral analyzer or channel, thereby detecting any deviation of signal light in order to flatten the wavelength characteristic.

Figure 32:
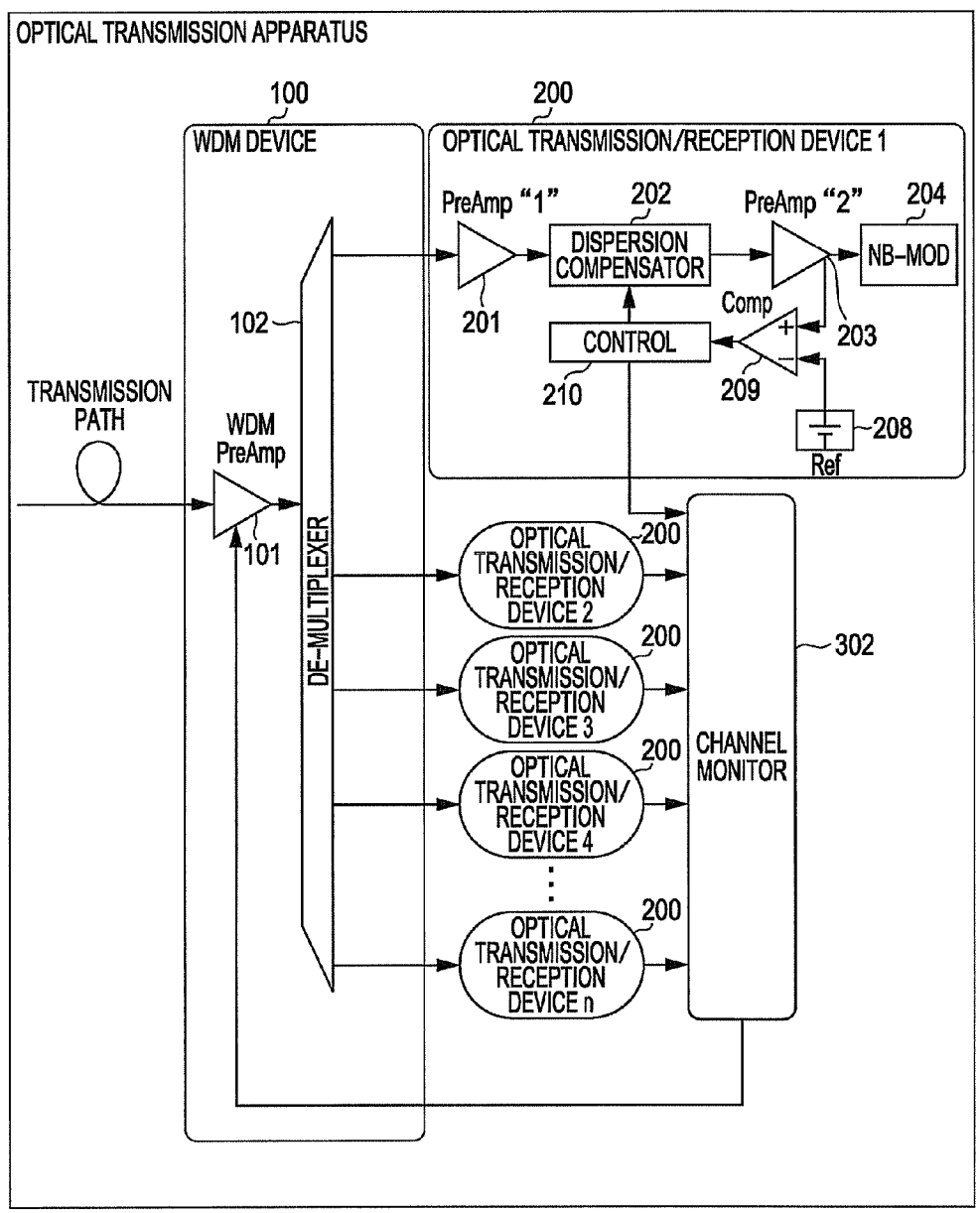
FIG. 32 is a block diagram of illustrates an exemplary optical transmission apparatus that performs an SN deterioration preventing process using a WDM PreAmp.

FIG. 32 illustrates, the Control 210 is connected to the WDM PreAmp 101 via the Channel Monitor 302. FIG. 32 illustrates an exemplary optical transmission apparatus that performs SN deterioration preventing process using the WDM PreAmp.

If the Comp 209 determines that an optical signal contains signal light, the Control 210 detects whether the frequency of the wavelength of the signal light has deviated from a predetermined frequency. If any deviation is detected, the Control 210 transmits the deviation frequency information to the Channel Monitor 302.

The Channel Monitor 302 receives the deviation frequency information from the Control 210 corresponding to each channel and transmits this information to the WDM PreAmp 101. Using this information, the WDM PreAmp 101 flattens the wavelength characteristic.

Figure 33:
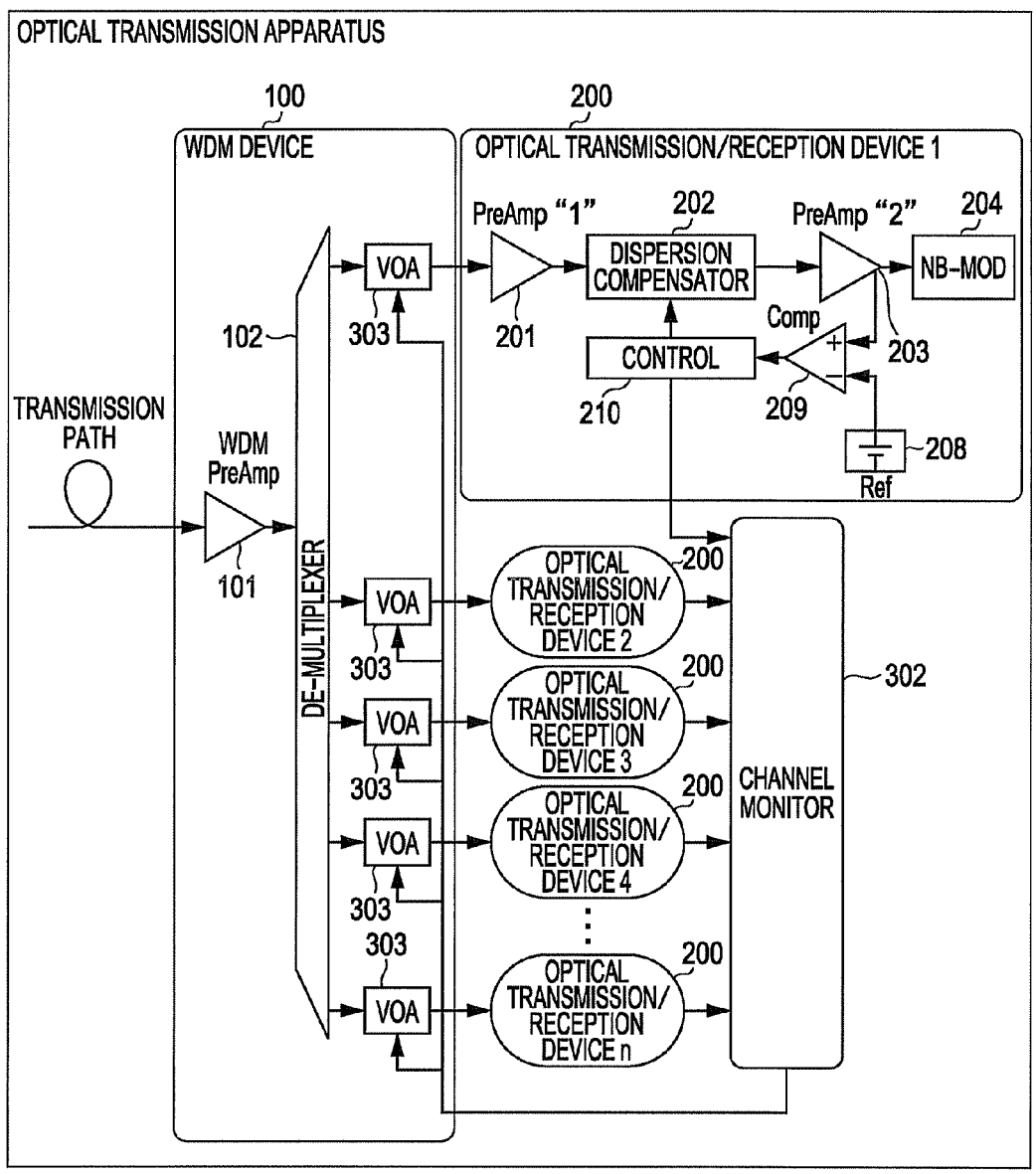
FIG. 33 illustrates an exemplary optical transmission apparatus that performs an SN deterioration preventing process using a VOA.

In an example shown in FIG. 33, each VOA 303 is disposed between the De-Multiplexer 102 and the corresponding optical transmission/reception device 200, and the Channel Monitor 302 is connected to the optical transmission/reception device 200 and VOA 303 which corresponds to each channel. FIG. 33 illustrates an exemplary optical transmission apparatus that performs an SN deterioration preventing process using a VOA.

The Channel Monitor 302 receives deviation frequency information from the Control 210 and transmits this information to the VOA 303 corresponding to a channel whose wavelength characteristic is to be flattened. Using the deviation frequency information, the VOA 303 flattens the wavelength characteristic.

Figure 34:
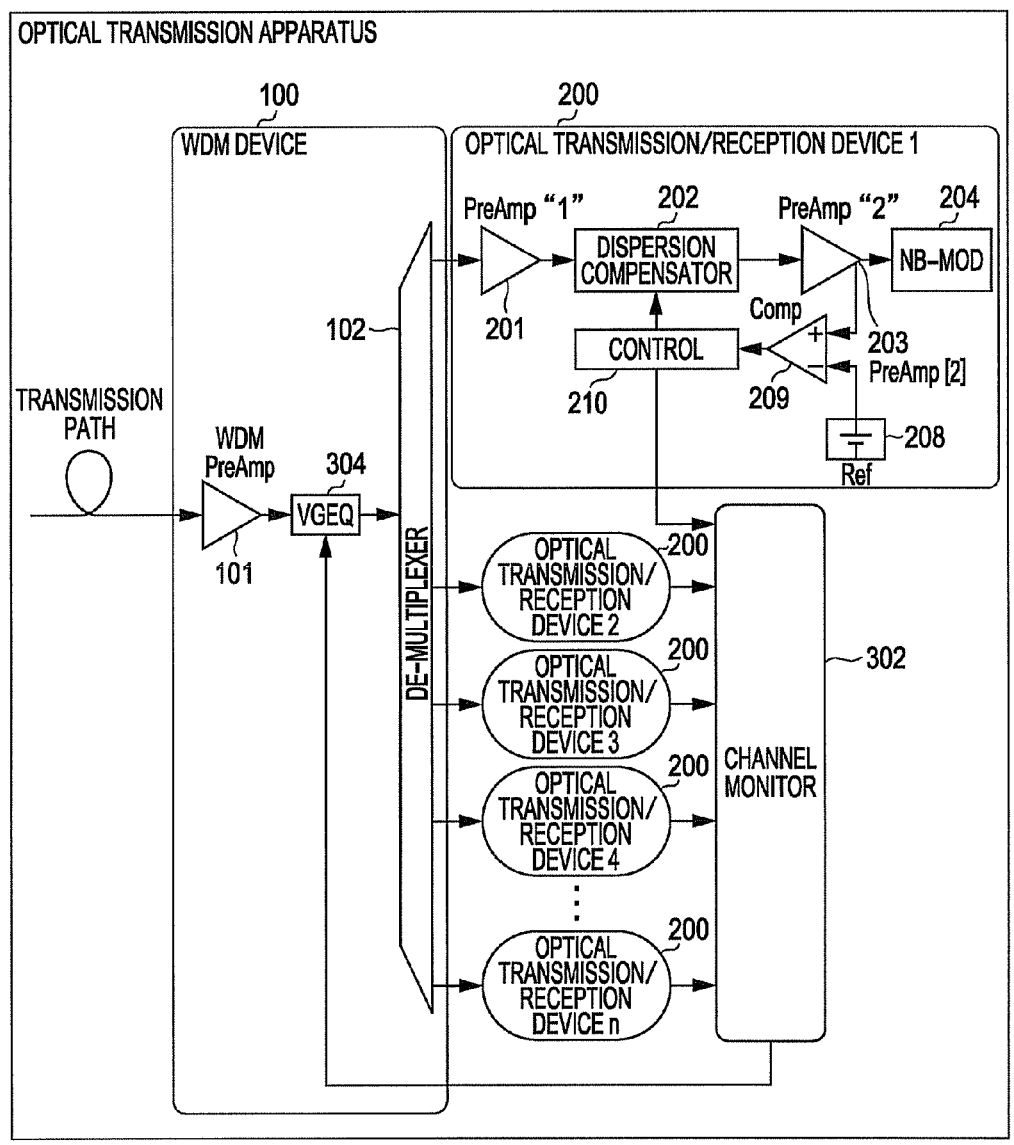
FIG. 34 illustrates an exemplary optical transmission apparatus that performs an SN deterioration preventing process using a VGEQ.

In an example shown in FIG. 34, a variable gain equalizer (VGEQ) 304 is disposed between the WDM PreAmp 101 and the De-Multiplexer, and the Channel Monitor 302 is connected to the VGEQ 304 and the optical transmission/reception device 200 corresponding to each channel. FIG. 34 illustrates an exemplary optical transmission apparatus that performs an SN deterioration preventing process using a VGEQ.

The Channel Monitor 302 receives deviation frequency information from the Control 210 and transmits this information to the VGEQ 304. Using the information, the VGEQ 304 flattens the wavelength characteristic. That is, the Channel Monitor 302 operates such that the VGEQ 304 reduces the tilt.

In FIG. 34, the VGEQ 304 is connected between the WDM PreAmp 101 and De-Multiplexer 102. However, the present invention is not limited to this, as the VGEQ 304 may alternatively be connected to the input side of the WDM PreAmp 101.

Figure 35:
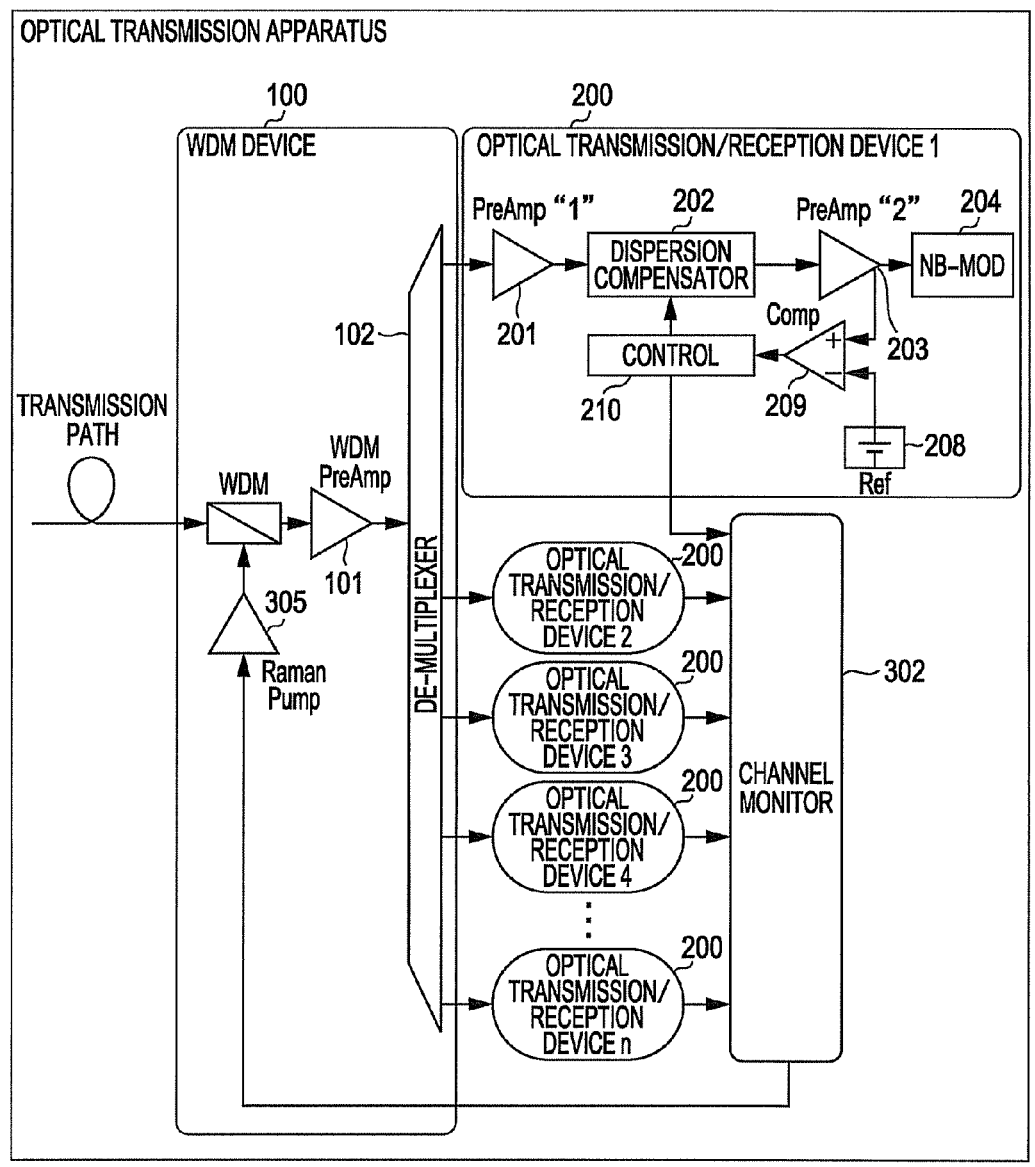
FIG. 35 illustrates an exemplary optical transmission apparatus that performs an SN deterioration preventing process using a Raman excitation light.

As shown in FIG. 35, the WDM device 100 further includes a Raman Pump 305 connected to the Channel Monitor 302. FIG. 35 illustrates an exemplary optical transmission apparatus that performs an SN deterioration preventing process using Raman excitation light.

The Channel Monitor 302 transmits deviation frequency information to the Raman Pump 305. The Raman Pump 305 emits Raman excitation light to an optical signal at the stage (labeled as "WDM" in FIG. 35) before the input of the optical signal to the WDM PreAmp 101, thereby flattening the wavelength characteristic.

The effect of the excitation light emission from the Raman Pump 305 depends upon the phenomenon of the Raman effect's decreasing where a small-wavelength signal deviates toward the long wavelength side. This makes it possible to flatten the wavelength characteristic by compensating for gain. That is, the Channel Monitor 302 varies the power of excitation light emitted from the Raman Pump 305, and thus the Raman Pump 305 operates to prevent tilt.

The Channel Monitor 302 may transmit deviation frequency information to an optical transmission apparatus on the transmission side and, on the transmission side, the Monitor 302 may compensate for the deviation.

Figure 36:
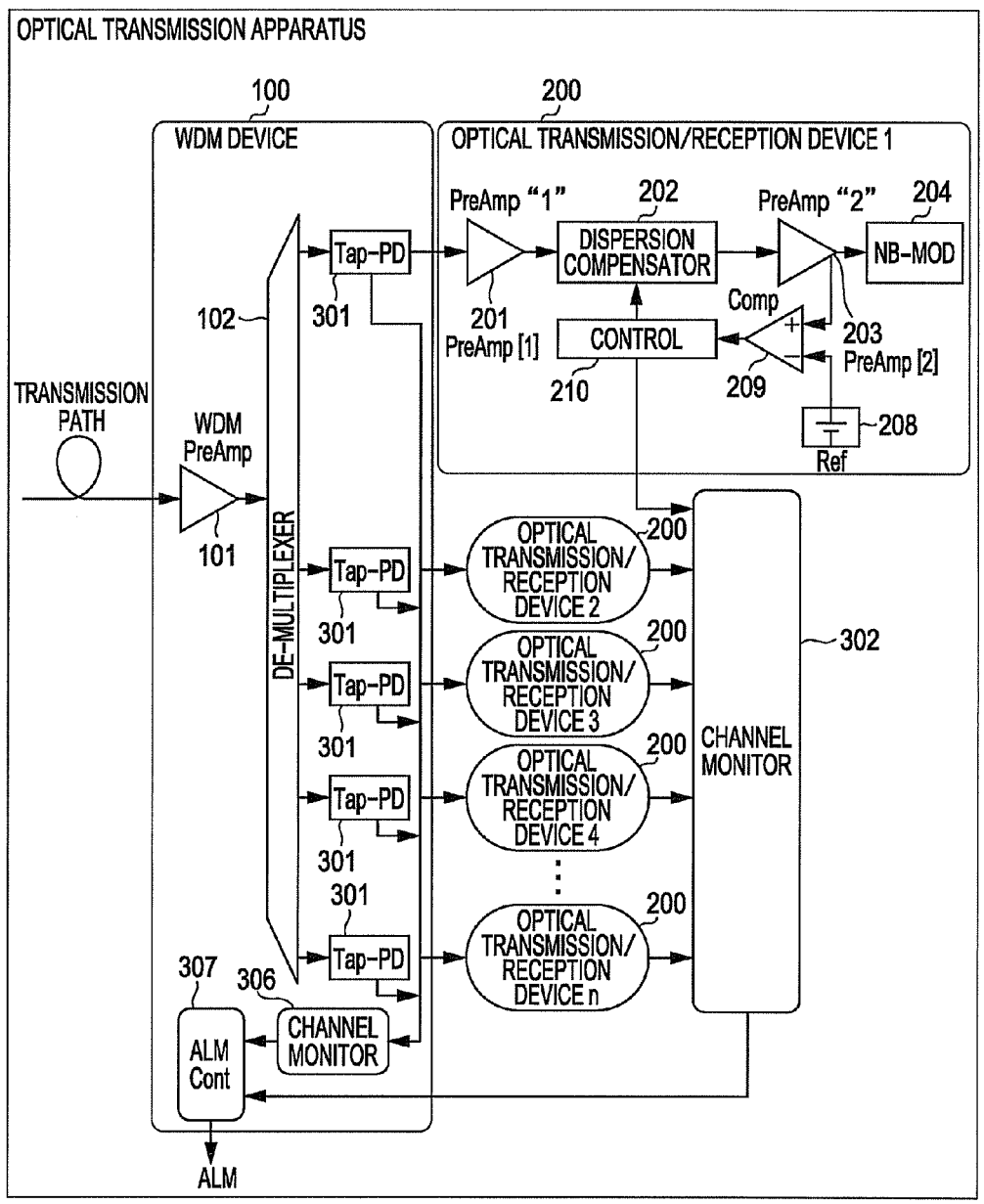
FIG. 36 illustrates an exemplary optical transmission apparatus that detects an abnormal connection between the WDM device and optical transmission/reception device.

For example, an abnormal connection between the WDM device and each optical transmission/reception device may be detected, as shown in FIG. 36. In an example shown in FIG. 36, the WDM device 100 further includes a Channel Monitor 306 that monitors an optical signal output to each channel from the De-Multiplexer 102. FIG. 36 illustrates an exemplary optical transmission apparatus that detects an abnormal connection between the WDM device and each optical transmission/reception device.

In an example shown in FIG. 36, the Channel Monitor 306 is connected to each of the Tap-PDs 301 disposed between the De-Multiplexer 102 and the corresponding optical transmission/reception devices 200, and is also connected to an ALM CONT 307. The Channel Monitor 306 receives information about operating channels from the Tap-PD 301 corresponding to each channel, and transmits it to the ALM CONT 307.

The Channel Monitor 302 receives the information about operating channels from the Control 210 corresponding to each channel, and transmits it to the ALM CONT 307.

The ALM CONT 307 is connected to the Channel Monitors 302 and 306 and determines whether information received from the Channel Monitor 302 and information received from the Channel Monitor 306 differ from each other. To be specific, the ALM CONT 307 determines whether the number of channels operating at the stage of output from the WDM device 100 differs from the number of channels operating in the corresponding optical transmission/reception device 200. If the numbers differ, the ALM CONT 307 thus determines that the connection between the WDM device 100 and the optical transmission/reception device 200 is in an abnormal state. The ALM CONT 307, therefore, provides warning in order to inform a user of the abnormal state.

For example, an S/ASE ratio may be calculated in order to monitor the state of the apparatus.

The Control 210 can calculate the ratio of the power of signal light to the power of ASE light (S/ASE ratio) by controlling the center wavelength.

Specifically, where an optical signal containing signal light is input to the optical transmission/reception device 200, the Control 210 calculates the power <Pout> of the optical signal output when an optical signal whose center wavelength corresponds to signal light is input to the dispersion compensator 202. In addition, the Control 210 prevents the signal light from being attenuated and output as a result of shifting the center wavelength of the dispersion compensator 202. Thus, the Control 210 calculates the power <Pase> of the optical signal as when only ASE light is output from the dispersion compensator 202.

In this case, the optical signal contains signal light and ASE light. The power of the optical signal includes the power <Psig> of the signal light and the power <Pase> of the ASE light. The power of the signal light is a value obtained by subtracting the power of the ASE light from the power of the optical signal. Therefore, an S/ASE ratio is found by dividing the value of the result of the subtraction of the power of the ASE light from the power of the optical signal by the power of the ASE light. This is represented by the following expression: <Psig>+<Pase>=<Pout>→<Psig>=<Pout>−<Pase>S/ASE ratio=<Pout>−<Psig>/<Pase>.

For example, the Control 210 may calculate an S/ASE ratio constantly and monitor any change in its value. If there is a significant change in the value, the Control 210 may inform a user that an abnormal state may have arisen in the dispersion compensator 202 or PreAmp [1] 201.

An S/ASE ratio may be calculated constantly and any change in value may be monitored. If a small S/ASE ratio (i.e., a deteriorated state) is detected, control may be exerted to increase the value. The Control 210 periodically outputs a signal-light/ASE ratio, and monitors whether this periodically output signal-light/ASE ratio approaches a smaller value. If the Control 210 determines as a result of the monitor that the signal-light/ASE ratio approaches a smaller value, the PreAmp [1] 201 may control the gain, thereby increasing the signal-light/ASE ratio. In addition, if the WDM device 100 is configured so as to vary the power of each channel, the Control 210 may transmit the monitor result to the WDM device 100, thereby increasing the signal-light/ASE ratio in the WDM device 100. Incidentally, the WDM device 100 may vary the power of each channel, for example, by disposing the VOA 303 between the De-Multiplexer 102 and the PreAmp [1] 201. This makes it possible to maintain, for example, the S/ASE ratio at an appropriate value.

Instead of an S/ASE ratio, for example, the power loss of the dispersion compensator 202 may be monitored. That is, the insertion loss <TDC_loss> made by the dispersion compensator 202 is an optical signal filtered by the dispersion compensator. If the power of an optical signal output from the PreAmp [1] 210 is <Pao>, the insertion loss <TDC_loss> of the dispersion compensator 202 can be calculated from <Pao> and <Pout>.

That is, the power of the optical signal output from the PreAmp [1] 201 is the sum of the insertion loss made by the dispersion compensator 202 and the power of light output from the dispersion compensator 202. Therefore, the insertion loss made by the dispersion compensator 202 is equal to the power obtained by subtracting the power of the light output from the dispersion compensator 202, from the power of the optical signal output from the PreAmp [1] 201: <Pao>=<Pout>+<TDC_loss>→<TDC_loss>=<Pao>−<Pout>.

Figure 37:
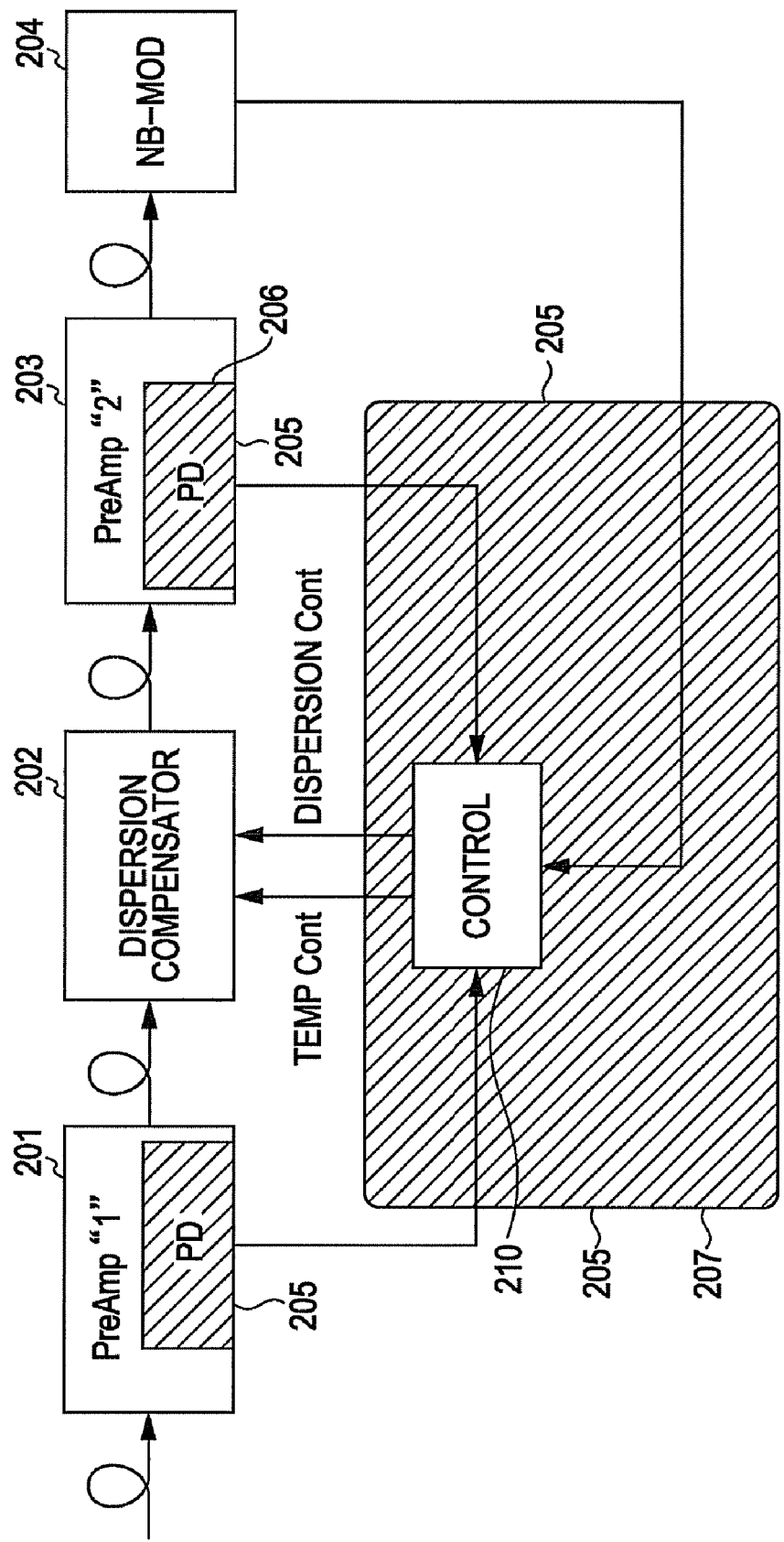
FIG. 37 illustrates an exemplary optical transmission/reception device that monitors dispersion compensator insertion loss.

For example, as shown in FIG. 37, PDs 206 for monitoring the power of an optical signal are additionally disposed in the PreAmp [1] 201 and PreAmp [2] 203, one for each, and are connected to the Control 210. FIG. 37 is a block diagram of an exemplary optical transmission/reception device that monitors dispersion compensator insertion loss.

In this case, receiving the powers of the optical signals from the PDs 206 disposed in the PreAmps [1] [2] 201 and 203 enables the Control 210 to calculate the insertion loss made by the dispersion compensator 202.

In the first and second embodiments, descriptions were given assuming that the PD 206 was used as an optical input monitor PD incorporated in the PreAmp [2] 203, and as a Tap-PD 301, respectively. However, the present invention is not limited to this. For example, the PD 206 may be actualized in the following manner: a line for light transmitted from the dispersion compensator 202 to the PreAmp [2] 203 is divided into branches by a coupler and a PIN-PD is provided for each branch.

For example, if a determination is made that an input light contains no signal light, an optical transmission apparatus may transmit the information that the input light contains no signal light to another optical transmission apparatus that receives the light output from the former optical transmission apparatus. The optical transmission apparatus in which an abnormal state has been detected may transmit this abnormal state information to an optical transmission apparatus (to which the optical signal is to be transmitted) located downstream of the optical transmission apparatus in which the abnormal state has arisen.

For example, the optical transmission apparatus may transmit to another optical transmission apparatus information that an optical signal contains no signal light, by using the monitoring control signal light relayed between the optical transmission apparatuses. To give a more detailed example, using the monitor control signal light, the optical transmission apparatus may inform another optical transmission apparatus of the number of operating channels together with information for identifying the channel of an optical signal that has been determined to contain no signal light.

This enables a user to recognize whether an abnormal state has been detected in the optical transmission apparatus and to deal with the problem immediately.

All or part of each of the automatic processes in the foregoing embodiments may be performed manually. Equally, all or part of each of the manual processes in the foregoing embodiments may be performed automatically, by any known method. For instance, the power of output light and a threshold may be compared manually.

Additionally, processing procedures, control procedures, detailed names, information including various data and parameters shown in the document and figures, may be altered as required unless otherwise specified (e.g., FIGS. 1 to 37).

The compositional elements of each device shown in the accompanying drawings are conceptual in terms of function, and do not have to be physically configured as shown in the drawings. That is, the detailed forms of the separation and integration of the devices are not limited to those illustrated in the drawings. According to the load or use, all or some of the devices may physically or functionally be separated from or integrated into any unit. For example, in the example illustrated in FIG. 5, the WDM device 100 and the optical transmission/reception device 200 may be integrated into one device.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An optical reception device comprising:
a filtering unit that receives input light of predetermined power, filters the input light by use of filter characteristics where the degree of attenuation of the power of an optical signal of predetermined frequency is lower than the degree of attenuation of the power of an optical signal of another frequency, and supplies an output light;
a determining unit that compares a value relevant to the power of the output light supplied by the filtering unit, with a threshold, and determines whether the input light contains signal light; and
a control unit that controls the filtering characteristics of the filtering unit such that the filtering unit supplies a first output light and a second output light one after the other, the first output light has been filtered using filter characteristics where the predetermined frequency is the same as the frequency of the signal light, and the second output light has been filtered using filter characteristic where the predetermined frequency is different from the frequency of the signal light; wherein the determining unit compares a power difference between the first and second output lights supplied one after the other by the filtering unit through the control exerted by the control unit, with the threshold, and determines whether the input light contains signal light.

2. The optical reception device according to claim 1, wherein the filtering unit receives the input light of the predetermined power, and filters the input light received using filter characteristics where the degree of attenuation of the power of an input light containing signal light is lower than the degree of attenuation of the power of an input light not containing signal light, and supplies the output light, and the determining unit compares the power of the output light supplied from the filtering unit, with the threshold, and determines whether the input light contains signal light.

3. The optical reception device according to claim 1, wherein the input light contains the signal light and ASE light or contains only ASE light, further comprising: an input light control unit that, if the determining unit determines that the input light contains the signal light, controls the filter characteristics of the filtering unit such that the filtering unit supplies the output light containing the signal light and the output light containing only the ASE light one after the other, the output light containing the signal light has been filtered using the filter characteristics where the predetermined frequency is the same as the frequency of the signal light, and the output light containing only the ASE light has been filtered using the filter characteristics where the predetermined frequency is different from the frequency of the signal light; and an output unit that outputs a signal-light/ASE ratio obtained by the following calculation: the power of the output light containing the signal light is divided by the power of the output light containing only the ASE light, wherein these powers have been supplied one after the other by the filtering unit through the control exerted by the input light control unit.

4. The optical reception device according to claim 3, wherein the output unit periodically outputs the signal-light/ASE ratio, further comprising: a signal-light/ASE ratio monitoring unit that monitors whether the signal-light/ASE ratio periodically output by the output unit approaches a lower value; and a signal-light/ASE ratio control unit that, if the signal-light/ASE ratio monitoring unit determines that the signal-light/ASE ratio approaches the small value, increases the signal-light/ASE ratio.

5. The optical reception device according to claim 2, wherein the threshold is a value of the power of the output light supplied by the filtering unit when the input light contains only the ASE light.

6. The optical reception device according to claim 1, further comprising a stopping unit that, if the determining unit determines that the input light contains no signal light, stops devices used for processes subsequent to a process performed by the filtering unit.

7. The optical reception device according to claim 1, further comprising a deviation detecting unit that, if the determining unit determines that the input light contains the signal light, detects deviation of the signal light from a predetermined wavelength; and a correcting unit that corrects the deviation detected by the deviation detecting unit.

8. The optical reception device according to claim 1, further comprising a signal-light-information transmitting unit that, if the determining unit determines that the input light contains no signal light, transmits to an optical transmission apparatus to which the output light is to be supplied, information that the determining unit determined that the input light contained no signal light.

9. An optical reception device comprising:
a filtering unit that receives input light of predetermined power, filters the input light by use of filter characteristics where the degree of attenuation of the power of an optical signal of predetermined frequency is lower than the degree of attenuation of the power of an optical signal of another frequency, and supplies an output light;
a determining unit that compares a value relevant to the power of the output light supplied by the filtering unit, with a threshold, and determines whether the input light contains signal light; and
an output unit that outputs a value obtained by the following calculation: the power of the input light received by the filtering unit is divided by the power of the output light supplied by the filtering unit.

10. An optical receiving method comprising:
a filtering operation in which an input light of predetermined power is received, the input light is filtered using a filter having filter characteristics where the degree of attenuation of the power of an optical signal of predetermined frequency is lower than the degree of attenuation of the power of an optical signal of another frequency, and an output light is supplied; and
a determining operation in which a value relevant to the power of the output light supplied in the filtering operation is compared with a threshold, and a determination is made whether the input light contains signal light; and
a control operation that controls the filtering characteristics of the filtering operation such that the filtering operation supplies a first output light and a second output light one after the other, the first output light has been filtered using filter characteristics where the predetermined frequency is the same as the frequency of the signal light, and the second output light has been filtered using filter characteristic where the predetermined frequency is different from the frequency of the signal light; wherein the determining operation compares a power difference between the first and second output lights supplied one after the other by the filtering operation through the control exerted by the control unit, with the threshold, and determines whether the input light contains signal light.

11. An optical transmission apparatus comprising:
an optical reception device that includes: a filtering unit that receives an input light of predetermined power, filters the input light by use of filter characteristics where the degree of attenuation of the power of an optical signal of predetermined frequency is lower than the degree of attenuation of the power of an optical signal of another frequency, and supplies an output light; and a determining unit that compares a value relevant to the power of the output light supplied by the filtering unit, with a threshold, and determines whether the input light contains signal light; and
a control unit that controls the filtering characteristics of the filtering unit such that the filtering unit supplies a first output light and a second output light one after the other, the first output light has been filtered using filter characteristics where the predetermined frequency is the same as the frequency of the signal light, and the second output light has been filtered using filter characteristic where the predetermined frequency is different from the frequency of the signal light; wherein the determining unit compares a power difference between the first and second output lights supplied one after the other by the filtering unit through the control exerted by the control unit, with the threshold, and determines whether the input light contains signal light.

12. An optical transmission apparatus comprising:
a filtering unit that filters an input where a degree of attenuation of power of an optical signal of a first frequency is lower than the a degree of attenuation of the power of an optical signal of second frequency;
a determining unit that compares a value relevant to the power of the filtered light with a threshold, and outputs a result; and
a control unit that controls the filtering characteristics of the filtering unit such that the filtering unit supplies a first output light and a second output light one after the other, the first output light has been filtered using filter characteristics where the predetermined frequency is the same as the frequency of the signal light, and the second output light has been filtered using filter characteristic where the predetermined frequency is different from the frequency of the signal light; wherein the determining unit compares a power difference between the first and second output lights supplied one after the other by the filtering unit through the control exerted by the control unit, with the threshold, and determines whether the input light contains signal light.

* * * * *

UNITED STATES PATENT AND TRADEMARK OFFICE
CERTIFICATE OF CORRECTION

PATENT NO. : 8,401,397 B2
APPLICATION NO. : 12/623898
DATED : March 19, 2013
INVENTOR(S) : Tsukasa Takahashi It is certified that error appears in the above-identified patent and that said Letters Patent is hereby corrected as shown below:

In the Claims

Column 25, Line 32, In Claim 10, delete "supplied; and" and insert -- supplied; --, therefor.

Column 26, Line 30, In Claim 12, delete "the a" and insert -- the --, therefor.

Signed and Sealed this
Thirteenth Day of August, 2013

Teresa Stanek Rea
*Acting Director of the United States Patent and Trademark Office*